US011399260B2

(12) United States Patent
Denninghoff

(10) Patent No.: US 11,399,260 B2
(45) Date of Patent: Jul. 26, 2022

(54) SYSTEM AND METHOD FOR USING POSITIONING INFORMATION IN AN ELECTRONIC COMMUNICATION NETWORK TO AFFECT WHEN AS ASSET OBTAINS A LOCATION ESTIMATE

(71) Applicant: Logic20/20 Inc., Seattle, WA (US)

(72) Inventor: Karl L. Denninghoff, Snohomish, WA (US)

(73) Assignee: LOGIC20/20 INC., Seattle, WA (US)

( * ) Notice: Subject to any disclaimer, the term of this patent is extended or adjusted under 35 U.S.C. 154(b) by 0 days.

(21) Appl. No.: 16/711,659

(22) Filed: Dec. 12, 2019

(65) Prior Publication Data

US 2020/0196117 A1 Jun. 18, 2020

Related U.S. Application Data

(60) Provisional application No. 62/778,351, filed on Dec. 12, 2018.

(51) Int. Cl.
| | | |
|---|---|---|
| *H04W 4/029* | (2018.01) | |
| *H04W 4/44* | (2018.01) | |
| *G01S 19/26* | (2010.01) | |
| *H04W 4/02* | (2018.01) | |
| *H04W 4/38* | (2018.01) | |
| *H04W 4/35* | (2018.01) | |

(Continued)

(52) U.S. Cl.
CPC ............ *H04W 4/029* (2018.02); *G01S 19/26* (2013.01); *G06K 7/10099* (2013.01); *H04W 4/027* (2013.01); *H04W 4/35* (2018.02); *H04W 4/38* (2018.02); *H04W 4/44* (2018.02); *H04W 4/70* (2018.02)

(58) Field of Classification Search
CPC ......... H04W 4/029; H04W 4/38; H04W 4/44; H04W 4/70; H04W 4/35; H04W 4/027; G01S 19/26; G06K 7/10099
See application file for complete search history.

(56) References Cited

U.S. PATENT DOCUMENTS

| | | | |
|---|---|---|---|
| 8,884,746 B1 * | 11/2014 | Cho ........................ | G06F 3/016 340/870.18 |
| 10,055,019 B2 * | 8/2018 | Beran .................... | A63F 13/577 |
| 10,909,830 B1 * | 2/2021 | Stapleford .............. | H04W 4/90 |

(Continued)

*Primary Examiner* — Joseph H Feild
*Assistant Examiner* — Rufus C Point
(74) *Attorney, Agent, or Firm* — Emerson, Thomson & Bennett, LLC; Roger D. Emerson

(57) ABSTRACT

A computer-implemented system and method for efficient navigation, location, tracking, and collocation of assets in electronic communication networks, which includes mutual tracking of target assets and tracking assets, reducing frequency and duration of radio transmission and reception of data, reducing the need for and frequency of GNSS (e.g. GPS) fixes and other power-hungry radio-based location sensing, predicting future movements of assets, and actions based on adherence to predictions of future movements of assets. Specifically, the computer-implemented system and method relates to the general use of positioning information of a second asset at a first asset to affect when the first asset obtains a NSS (i.e. a GPS) location estimate (also called a fix). The first asset can be either a tracking or a target asset, or both assets simultaneously track each other.

14 Claims, 11 Drawing Sheets

(51) Int. Cl.
  *G06K 7/10*  (2006.01)
  *H04W 4/70*  (2018.01)

(56) References Cited

U.S. PATENT DOCUMENTS

| | | | |
|---|---|---|---|
| 11,051,131 B2* | 6/2021 | Denninghoff | G01S 19/26 |
| 2001/0048364 A1* | 12/2001 | Kalthoff | H04W 4/023 |
| | | | 340/8.1 |
| 2003/0058163 A1* | 3/2003 | Zimmerman | G01S 19/41 |
| | | | 342/464 |
| 2004/0034470 A1* | 2/2004 | Workman | G08B 25/10 |
| | | | 701/490 |
| 2005/0179539 A1* | 8/2005 | Hill | G08B 13/19632 |
| | | | 340/521 |
| 2008/0183384 A1* | 7/2008 | Gaal | G01S 19/25 |
| | | | 342/357.29 |
| 2011/0246148 A1* | 10/2011 | Gupta | H04W 4/33 |
| | | | 703/2 |
| 2012/0154218 A1* | 6/2012 | Mia | G01S 5/06 |
| | | | 342/378 |
| 2012/0182182 A1* | 7/2012 | Riley | G01S 19/25 |
| | | | 342/357.58 |
| 2012/0188938 A1* | 7/2012 | Venkatraman | H04W 64/003 |
| | | | 370/328 |
| 2013/0017840 A1* | 1/2013 | Moeglein | G01S 5/0205 |
| | | | 455/456.1 |
| 2013/0178231 A1* | 7/2013 | Morgan | H04W 4/023 |
| | | | 455/456.1 |
| 2013/0336138 A1* | 12/2013 | Venkatraman | G01S 19/48 |
| | | | 370/252 |
| 2014/0184442 A1* | 7/2014 | Large | G01S 19/41 |
| | | | 342/357.42 |
| 2014/0240170 A1* | 8/2014 | Rudow | G01S 19/07 |
| | | | 342/357.42 |
| 2014/0274136 A1* | 9/2014 | Edge | H04W 4/021 |
| | | | 455/456.2 |
| 2016/0036646 A1* | 2/2016 | Li | H04L 41/14 |
| | | | 709/223 |
| 2016/0159354 A1* | 6/2016 | Takayama | G01S 19/52 |
| | | | 701/70 |
| 2018/0146332 A1* | 5/2018 | Opshaug | G01S 5/10 |
| 2019/0281370 A1* | 9/2019 | Struhsaker | H04L 67/2804 |

* cited by examiner

SYSTEM AND METHOD FOR USING POSITIONING INFORMATION IN AN ELECTRONIC COMMUNICATION NETWORK TO AFFECT WHEN AS ASSET OBTAINS A LOCATION ESTIMATE

CROSS-REFERENCE TO RELATED APPLICATIONS

This application claims the benefit of U.S. provisional patent application Ser. No. 62/778,351, filed Dec. 12, 2018, the entire contents of which are incorporated herein by reference.

TECHNICAL FIELD

The present invention relates generally to positional tracking systems. Particularly, the present invention relates to the ability to more efficiently track and collocate with assets. Specifically, the present invention provides for a system and method in order to collocate a tracking asset with a target asset or navigate a tracking asset to a location while minimizing unnecessary radio transmissions and receptions from both tracking and target assets.

BACKGROUND

Efficiently tracking and collocating with assets of various kinds using electronic radio devices (both tracking and target electronic devices) has been studied intensely for several years and has been the subject of several patent applications. Of particular interest for target devices has been the need to prolong battery life and reduce bandwidth utilized by target devices. This has been achieved in part by controlling the expenditure of energy for purposes of establishing locations and transmitting locations of tracking devices. It has also been achieved by reducing the frequency of location transmission when it is not needed; for example, when there is no particular interest in the location of a particular target device.

An existing strategy is to provide target devices with multiple radio transceivers having varying ranges and power consumption. Energy savings occur by using the least power-consuming radio device that provides needed connectivity under the circumstances. Reduction of power consumption within radio technologies of all ranges has been continuously addressed. Examples include Bluetooth, WI-FI, and Cellular technologies, all of which have been independently improved through ongoing research into reduced power consumption.

Significant research continues into providing more accuracy in positioning devices along with lower consumption of power. For example, Global Positioning System (GPS) positioning devices that are more accurate and require less power have been created in a competitive market environment so that battery powered devices, including tracking and target devices, can be more effective, lighter, and perform longer between battery charges and battery changes.

The GPS is an example of a Global Navigation Satellite System (GNSS). Multiple other countries have also created their own. Examples of these include: "Globalnayanavigatsionnayasputnikovayasistema," or "Global Navigation Satellite System," (GLONASS, Russia); the European global navigation satellite system, called Galileo: and "Quasi-Zenith Satellite System," (QZSS, Japan). Some of these have a Satellite-based Augmentation System (SBAS). Examples of these include: "Wide Area Augmentation System," (WAAS, United States); and "European Geostationary Navigation Overlay Service," (EGNOS, Europe). China has its own GNSS system.

Technological improvements are earnestly sought to provide efficiency. Target devices have been equipped with computer executable programs designed to reduce battery consumption while at the same time providing effective tracking of the target device. For example, U.S. Pat. No. 7,138,914 recites the conservation of battery power by enabling transmission of a beacon transmitter only when desired by a monitoring agency (i.e., when a monitoring agency wishes to locate and perhaps collocate with a target asset, a monitor causes transmission of a signal that causes the target device to enter a mode of operation whereby it transmits its location or whereby it transmits its location more often).

Smartphones are used as navigation devices, and as such are also target devices that are tracked, having similar battery life issues as any other target device. For example, use of the smartphone for navigation when away from an external power source, such as when navigating on foot or on a bicycle, has this characteristic. Such a circumstance also occurs when smartphones are used to navigate powered vehicles such as automobiles or boats; users often do not connect their smartphone to external power even when available or may be traveling without a cable or other equipment needed to connect it to available external power. In any such circumstances, a smartphone runs in a navigation/tracking mode for an arbitrary length of time on its own battery. Thus, the same battery life issues arise for a smartphone navigation system as for any other target device.

For many years, innovations are and have been earnestly sought to provide useful combinations of lower power usage, more accurate location and movement information, and more timely location and movement information in tracking scenarios utilizing electronic equipment.

SUMMARY

In some embodiments, as will be shown in detail, in order to collocate a tracking asset with a target asset while minimizing unnecessary transmissions from the target asset, it is useful to dynamically, as a programmatic effect requiring no additional interactive inputs from a user, to use positioning information of the tracking asset to determine when or how often to transmit positioning information from the target asset. How precisely this information is needed depends in some embodiments on the distance, direction, and changes in distance and direction between the tracking asset and the target asset. For example, if a tracking asset is a mile away from a target asset, then moving the target asset 200 feet in any direction at most changes the heading of the target asset from the tracking asset by about 2 degrees. On the other hand, if the tracking asset is 150 feet away, then a movement of 200 feet could result in any heading whatsoever from the tracking asset. In such a circumstance the tracking asset could, while attempting to collocate with the target asset, nevertheless move directly away from it. Thus, the position of the tracking asset and its movements, along with the position of the target asset, can together beneficially be used to determine how often or when the target asset should transmit positioning information and thereby consume battery power Thus, in some embodiments, inputs into a computational determination of when to transmit positioning information from the target asset include positioning information of the tracking asset.

In some embodiments, movement of a target asset is usefully predicted. It can be effective to trade computation power, which in some embodiments is relatively cheap, against transmission power by predicting movements of a target asset. In such an embodiment new positioning information is transmitted only if the target asset has moved outside a predicted moving region, called an "allowed deviation region." The allowed deviation region may be two-dimensional, such as a rectangle, circle, ellipse, or any other geometric shape, or it may be three-dimensional, such as a hyper-rectangle, sphere, ellipsoid, or any other geometric shape appearing in three dimensions. In some embodiments, a moving allowed deviation region is bounded at a particular point in time in two dimensions by a pair of rays starting at a vertex, having an angle between them, and having a minimum and maximum distance from the vertex. For three dimensions, a cone starting at a vertex is used again with a minimum and maximum distance. These various allowed deviation region shapes are exemplary and a practitioner skilled in the art could use other two- or three-dimensional allowed deviation region shapes, of varying complexity, and either stationary or moving, without departing from these teachings.

In some embodiments the tracking asset and target asset beneficially use the same predictive calculation for the position of the target asset, so that the tracking asset benefits from knowledge that the target asset will transmit additional positioning information if it has gone outside that moving region. The predictive region in some embodiments is stationary if the asset has not moved recently, and in some embodiments has an accelerative prediction if it has recently begun to move.

In some embodiments the predicted position of the target asset is an arbitrary path, like the path of a road, and as long as the target device is within a certain distance from that path it does not transmit additional positioning information. Also, in some embodiments, if the speed of the target asset does not exceed a maximum value, and it is within a particular distance of the arbitrary path described above, it does not transmit additional positioning information. In some such embodiments, the target asset transmits positioning information at a default interval whereby, if there has been no transmission of the latest positioning observations in that length of time, then the new positioning information is transmitted. In some such embodiments, the default interval duration depends on a mode of operation; for example, the duration in some embodiments for a target asset is shorter if a tracking asset is collocating toward the target asset.

Since a target asset may know in more detail its own location (provided it is not within view of a human tracking asset), in some embodiments the target asset chooses a calculation model to predict its future location, which it transmits as positioning information. The predictive model for the target asset movement is advantageously chosen in some embodiments by the target asset. Nevertheless, in some such embodiments the size, shape, and orientation of a moving region in space or moving region on a surface is chosen by the tracking asset.

In some embodiments a tracking service is a tracking asset, although not itself mobile, and a mobile tracking asset can be directed toward a target asset by the tracking service. For example, a pet can be a target asset; a small electronic device on the pet's collar can be a target device; the pet's owner can be a tracking asset; the owner's smartphone can be a tracking device; and a mapping and navigation service can be enhanced as a tracking service that tracks both the smartphone and the target asset and assists the smartphone as a tracking device by providing dynamically changing navigational directions to the smartphone to enable the pet's owner to drive to the eventual location of his pet. In the foregoing example, the smartphone is both a target asset and a tracking asset; the assistance to the smartphone and its owner as a tracking asset, provided by the service, occurs in part by treating the smartphone and its owner as a target asset. Because the smartphone in this circumstance is also a target asset, techniques taught herein for reduction in power usage by target assets apply to the smartphone as a tracking asset.

In some embodiments and circumstances a smartphone can be a navigational target device only, i.e., it is without a mobile target that it is tracking so it is not a tracking device in the sense that it is tracking a mobile target. Nevertheless, the teachings herein for reducing power consumption of a tracking device or asset apply to usage in this circumstance. In this circumstance predictions of future movement for the mobile phone are beneficially used to reduce battery consumption by reducing the frequency of transmission of positioning information from the smartphone to a navigational mapping service. Likewise, in this circumstance predictions of future movement for the mobile phone are beneficially used to reduce battery consumption by reducing the frequency of obtaining GNSS positioning information from satellite transmissions. When a smartphone is used for navigating an automobile, a navigation system recommends movements of the automobile to a driver or an on-board autonomous control system. When made to a driver through a smartphone, in some embodiments predictions of movement based on the navigational suggestions can be more accurate than predictions for targets that have no reason to follow or even to know about the predictions. In some such embodiments, a near-future navigational path that is complete with utterances, which are to be made to the user when associated positions have been passed, is downloaded to the smartphone. In some such embodiments, if the smartphone does not deviate from the path, regardless of rate of progression along the path, then no transmission is made with new positioning information from the smartphone until a maximum time interval since the last such transmission is exceeded. In some such embodiments, negative progress on the path, which could occur, for example, if the user made a U-Turn, triggers a new transmission of positioning information. Benefits include longer battery life for the smartphone and less transmission bandwidth.

In some embodiments behavior as a target device is combined, such as in a smartphone, with simultaneous usage as a tracking device. Benefits in this scenario include longer battery life for any (other) target device that the smartphone may track by reducing power used by reception of messages since there are fewer messages received, which in almost all common radio technologies also includes at least some savings in transmission costs since some transmission typically occurs in conjunction with each reception.

When collocating toward a mobile asset by use of a smartphone for navigation, in some embodiments a change from an approaching mode to a follow-only mode is suggested to the user for safety reasons. For example, at 60 miles per hour a safe following distance would be greater than for 5 miles per hour. Therefore, in some embodiments a following distance is adjusted for conditions, including velocity of the assets. In some embodiments, when collocating toward a target asset, a user has an easy mechanism (e.g., a software button press) to establish the current distance to the target asset as a following distance. Again, for safety reasons, in some embodiments such a distance is modified dynamically and depends on speed.

In some embodiments the tracking asset can better know: 1) its own position relative to the target asset's reported or predicted positions; 2) its component of velocity toward a position or predicted position of the target asset (which could be positive, zero, or negative); and 3) its intentions, i.e., whether it is tracking only, following (as in collocating toward but maintaining a distance), or collocating toward and seeking to reduce the distance to the target asset. For example, if the tracking asset were a mile away, the allowed deviation region about a predicted position of the target asset in some embodiments is usefully larger than if the tracking asset were only 100 yards away. Also, in some embodiments, if the tracking asset is not currently attempting to close or collocate with the target asset, then the predicted region of the target asset is usefully larger than if the tracking asset is currently attempting to collocate toward the target asset.

If the intention of a tracking asset is to reduce the distance between it and a target asset, then the size of an allowed deviation region about the target asset can be usefully smaller in some embodiments than if the tracking asset is keeping its distance (e.g., both are stationary and have no current intention to reduce distance between them).

If the intention of a tracking asset is not perfectly knowable by computation, such as the tracking asset is a person recreationally tracking, or is a car, person, or pet with his smartphone, then in some embodiments the tracking asset's intentions, while formally unknowable, are nevertheless usefully inferred on the basis of recent movement of the tracking asset. For example, velocity of the tracking asset toward the target asset or a recent location of the target asset, which can be positive, negative, or zero, is in some embodiments used to infer an intention of the tracking asset to collocate with the target asset. Movements of the tracking asset are used in some embodiments to change the shape, size, or position of the allowed deviation region about the target asset.

In some embodiments, when a target asset finds itself outside an allowed deviation region, for that point in time, it will transmit a collected positioning information history and a prediction of future movement. The prediction of future movement in some embodiments is a simple direction and speed (together also known as velocity). In other embodiments, a prediction of movement is inferred from the transmitted history of positions of the target asset and computed from them identically by a target and tracking asset; in this way both have the same prediction but the prediction per-se is never transmitted. In other embodiments, such as where the target asset is an automobile, the prediction usefully includes a plan of movement, including planned speeds and locations at times in the future.

In some embodiments, once both the target asset and tracking asset have the same plan of movement for the target asset, then the target asset will save battery life by not transmitting new positioning information until it has strayed sufficiently from the prediction, or until a maximum amount of time between positioning information transmissions has been exceeded.

In some embodiments a tracking asset transmits a plan of its own movement to a target asset, along with a deviation rule, which comprises parameters that determine at least in part the size and shape of the allowed deviation region about the target asset predicted position at each point in time. In some such embodiments the allowed deviation region of the target asset, in two dimensions, looks like a surface bounded by two concentric circles and two rays (half lines) starting from the center of the circles. The position (or planned position) of the tracking asset is the vertex of the pair of rays and at the center between the two rays is the current or currently predicted position of the target asset. The inner circle is at a minimum distance from the vertex, which is defined as a fraction (positive multiplier less than one) of the predicted distance between the tracking and target assets. The outer circle is at a maximum distance from the vertex, which is defined as a fractional multiple (positive multiplier greater than one) of the current or predicted distance between the tracking and target assets.

With a shape that is elongated in the direction between the target and tracking assets, as described in the previous paragraph, the heading to the target asset remains within a certain error, while the distance toward or from the tracking asset (controlled by the distance parameter in the previous paragraph) can vary by much more. This allows the target asset to be given a movement plan of the tracking asset, which in some embodiments would be directly toward the target asset as can be achieved, for example, by an airborne drone and other tracking assets depending on circumstances, and the target asset only transmits positioning information if it strays from the changing shaped region, which progressively diminishes in size as the tracking asset approaches the target.

In some embodiments and circumstances a plan of movement of a tracking asset is a simple time, position, and velocity. In other embodiments or circumstances, it is a detailed plan of movement according to a street plan of an area, including stopping times at turns and other expected movements. Note that such plans do not require a great deal of space and in some embodiments go into the future only far enough that the tracking asset will again transmit its positioning information after a default time interval since the last transmission. Some embodiments use a simple plan of movement under some circumstances and a detailed plan of movement in other circumstances. For example, if the tracking asset is a person using a smartphone and is traveling on foot, the simple time, velocity, and position is used in some embodiments; and if the smartphone is being used to navigate an automobile to the target asset, then a more detailed plan is usefully utilized.

In some embodiments, a pair of assets can be tracking assets and target assets of each other (i.e., both are tracking assets and both are target assets). In this case, in some embodiments, the roles are independent. In other embodiments the roles and information is combined. For example, a tracking asset transmits positioning information for itself, as does a target asset, so the information can be combined and transmitted together with redundancies removed.

For most radio technologies, it is more consumptive of energy to transmit information than it is to receive the same information. Combining this with the fact that saving battery life on target devices (e.g., a pet tracking device) is in some embodiments more important than on tracking devices (e.g., a smartphone) that are regularly charged, a tracking device usefully transmits its position more often than a target device. For this reason, a tracking device in some embodiments has a smaller deviation from the planned movement before it will again transmit its position. Nevertheless, both receiving and transmitting is consumptive of power in the target device, and both are usefully reduced in frequency in some embodiments.

In some embodiments a tracking and a target asset each have an allowed deviation region that is dynamically determined. When the asset's position deviates outside the current allowed deviation region, it transmits its new position history and a plan for future locations, directions of movement, and speeds. At the time of transmission, the position of each asset is known within some error that is a characteristic of a positioning observing device. For example, a GNSS (e.g., GPS) has an accuracy that can vary according to environmental conditions, but some are orders of magnitude more precise than others, with some modern commercial devices having accuracy to within a few centimeters. However, except for such observational error, in some embodiments at the time of transmission the position of the transmitting asset is transmitted as accurately as it is known. Transmitted future plans are in some circumstances and some embodiments only a predictive guess for the target asset and a predictive intention for the tracking asset. The accuracy of a current plan for an asset, which is known to both tracking and target assets, is monitored by the asset itself and, when deviation from the current plan is sufficient for that asset, a transmission comprising a new accurate position, position history, and plan of future movement is transmitted.

In some embodiments, the allowed deviation region for each asset is a circle about its current planned position on the earth's surface; the assets in some embodiments do not have flight capability so their vertical position is assumed to be approximately the surface of the earth or of a body of water at their current position. So in three dimensions, formally speaking, the region is bounded by a circular cone having its vertex at the center of the earth and that extends upward, having the circle shape where it intersects with the surface, and extends out into space. In other words, the two-dimensional region does not consider or constrain vertical position. In other embodiments the region is instead a three-dimensional sphere or a bounded cone, for example a cone as before but that extends only 5 diameters of the circle above and beneath the known surface of the earth. Continuing with some two-dimensional embodiments, the allowed deviation region of the target asset is a circle that has a diameter of 30% of the planned distance, for each point in time, between the tracking and target assets. The allowed deviation region of the tracking asset is a circle having a diameter of 15% of the planned distance, for each point in time, between the tracking and target assets. Thus, the size of the allowed deviation region varies dynamically and automatically with the distance or planned distance between the tracking and target assets. In general, when the distance is greater, transmissions are automatically less frequent and thus bandwidth and energy are conserved. Moreover, if planned movements are somewhat accurate, especially for the target asset, then transmissions again are automatically less frequent, and bandwidth and energy are again conserved.

In some embodiments, the current intentions of the tracking asset are used to further reduce power consumption and save battery life. In some embodiments, if the tracking asset is passively tracking, and is not currently attempting to collocate toward (not attempting to reduce the distance to or to follow) the target asset, then the size of the allowed deviation region for the target asset is larger, and thereby beneficially transmissions are reduced from the target asset to conserve power. In some embodiments the intentions of the tracking asset cannot be known precisely or may change rapidly. For example, if the tracking asset is a person using a smartphone to track a pet, and especially if the person (perhaps a child) is using a tracking device as a toy to play at tracking or collocating toward a pet, then the intention may change arbitrarily and from moment to moment. However, persons cannot be relied upon to accurately and dynamically alter modes of operation from moment to moment (from a tracking mode to a collocation mode), and thereby contribute dynamically to saving battery life. Thus, in some embodiments, movements or movement plans of a tracking asset are beneficially used to dynamically infer intentions of a tracking asset.

In some embodiments, a circular allowed deviation region is automatically doubled in size if the tracking asset is not currently attempting to collocate toward a target asset. This intention may be known explicitly as might be the case for an automated drone tracking device. This intention may alternately be inferred on the basis of current planned movements of a tracking asset. In some embodiments, for example, if current plans of movement for a tracking asset and a target asset would not result in reducing the distance between the current asset and the target asset, then the current intention of the tracking asset is presumed to not include reducing the distance between the target and tracking assets; and the allowed deviation region of the target asset is doubled in size while that condition holds. In other embodiments, an intention to collocate toward the target is inferred from movement of the tracking asset in any direction at all (i.e., the current plan includes current movement).

In some embodiments, a tracking service infers a movement plan for a tracking device and transmits it to the tracking device and a target device. In some embodiments such a tracking service also contributes to the plans of the tracking device. In some embodiments such movement plans are generated more accurately by using data like topological, roadway, or other environmental information for the locales of the tracking and target assets. Also in some embodiments, a tracking service has access to computational and data resources that are not available locally to a target device or a tracking device. For example, in some embodiments, a tracking service notices that movement of a target asset is following a road; it then creates a target asset movement plan that predicts that the position of the target asset will continue to be on the road and sends that movement plan to both the target asset and tracking asset.

In some circumstances for some embodiments, an allowed deviation region for a target asset comprises a route on a roadway that extends for many miles along the roadway, and a dynamic aspect of the region is a maximum distance from that planned roadway before the target asset will again transmit its position. In some such embodiments, a target asset transmits its past positions that are saved since the last successful transmission; in addition to keeping the history of movement, such recent past positioning supports more accurate predictions of future movement by a tracking service.

In some embodiments, historical positioning information is transmitted by a target asset along with current position and future plans. In some embodiments, a tracking service or a tracking device can accept the plans of a target device or alter them. In some such embodiments, if either alters them, then the altered plans for a target asset are transmitted to the target asset; such transmission in some embodiments is direct from a tracking asset to a target asset, in some embodiments such transmission is from a tracking service to a target asset. In some embodiments such a received plan, from a tracking service or a tracking asset, overrides an existing plan that had been previously created by a target device or asset itself, and again both the target asset and the tracking asset use the same plan for the target asset.

In a scenario where a target asset is stationary, and a plan for the target asset is also stationary, then a tracking asset will know the position of the target asset with accuracy and need not receive updates for its position. However, in some embodiments, a target asset will transmit its history of movement at a default frequency, regardless of the fact that it has not moved outside a plan. Similarly, a plan can have been a sufficiently accurate prediction of target asset movement that the position of the target asset has always remained within its dynamic allowed deviation region. Nevertheless, in some embodiments the target asset will transmit its history of movement at a time when a predetermined maximum duration has elapsed since the last such transmission was made.

In some embodiments a tracking asset transmits a plan of movement relative to the target asset, and only if its position deviates from that plan, relative to the current target asset plan, does the tracking asset transmit new positioning information for itself. In some such embodiments, only current and planned distances to the target asset are used by the tracking asset to determine when to transmit. In some such embodiments, only current and planned distances to the target asset are transmitted by the tracking asset. This is beneficial in reducing transmissions of positioning information from a tracking asset as it allows the tracking asset to be at any position about a target asset that is approximately a planned distance to the target asset, without triggering a transmission from the tracking asset. Note that when a target asset's allowed deviation region is circular or spherical about a planned position of the target asset, and the size of that region depends only on a planned distance between the tracking and target assets, such an embodiment will in many scenarios beneficially experience reduced transmissions of tracking asset positioning information. Moreover, in such embodiments and circumstances, the otherwise additional information that is not used by or sent from the tracking asset would have little or no effect on when the target asset transmits positioning information.

In some embodiments a target asset allowed deviation region is an intersection or a union of two other regions. For example, an allowed deviation region during tracking or collocating can be the union of an allowed deviation region as defined above for general tracking and an arbitrary region defined by a user that is sometimes called a "geofence" region, perhaps about a home of a dog owner. In this way a target asset, that remains approximately where it is expected on a permanent basis, beneficially does not transmit except at a default interval. However, outside such a geofence region an allowed deviation region is defined as described previously. In such embodiments and logically speaking, in effect the allowed deviation region is the union of the geofence region and an allowed deviation region as described previously.

In some embodiments there are multiple possible allowed deviation region rules. For example, in some circumstances the shape as well as the size of an allowed deviation region can vary markedly from other circumstances for the same embodiment. For example, a geofence region described above can, by configuration, affect the size and shape of an allowed deviation region depending on whether a pet is configured with such a region.

In some embodiments assets can be designated or configured as roadway-bound. This can be useful, for example, for assets such as automobiles, trucks, and motorcycles. Moreover, assets can be roadway-bound by choice. In addition, almost any roadway-bound asset can leave roadways depending on circumstances. For example, dirt roads and in some cases actual constructed roadways may exist that are not in one or more roadway databases. Notwithstanding these limitations, in some embodiments designating an asset as roadway-bound causes it to be presumed to be navigating according to roadways known to a database of roadways until proven otherwise. Therefore, in some embodiments an asset is usefully categorized as roadway-bound on a temporary basis. This is useful, for example, when a target asset is temporarily transported in a roadway-bound vehicle. A roadway-bound asset, which is either determined temporarily to be roadway-bound or configured to be roadway-bound, is in some embodiments predicted in its movements more effectively, which thereby beneficially reduces transmissions from the roadway-bound asset.

In some embodiments an asset is temporarily designated as roadway-bound based upon its movement history. For example, if an asset has been moving for a period of time along roadways (e.g., on roadways within a margin of error for a positioning device) and near the surface of the earth (e.g., not above a known roadway by more than a margin of error for the positioning device), then it is temporarily designated as roadway-bound. In some embodiments high speed movement along a roadway can result in an earlier designation as temporarily roadway-bound. This is useful because roadways facilitate particularly rapid surface movement and rapid surface movement along a roadway implies with higher probability that an asset is at least temporarily roadway-bound. In some embodiments, once designated as roadway-bound, an asset remains temporarily roadway-bound until its position deviates significantly (such as more than 100 feet), but the distance usefully depends on the accuracy of positioning devices and estimates based on them, from roadways known to a database of roadways.

In some embodiments, when an asset is designated as temporarily roadway-bound, its future movements are predicted to remain on a road. Thus, for example, if it is currently moving at 60 miles per hour down a highway, in some embodiments it will be predicted to remain on the path of the highway at 60 miles per hour. Even though an asset may be moving rapidly, its position in some embodiments is predicted with sufficient accuracy by this means to beneficially reduce transmissions. In some embodiments a base roadway region is modeled by a center-line path, which includes horizontal and vertical positioning, for movement in a particular direction. A roadway-radius, which is a horizontal distance from the center line path to the edge of the modeled road, is also included for every stretch of modeled roadway. Practitioners skilled in the art will appreciate that roadways and paths can be modeled in many different ways with varying accuracy without departing from the teachings herein. Thus, for a typical road with movement in two directions there are two paths with a distance to the edge for stretches of the road. The stretches of the road, in the database, collectively model the whole of the road. In the model, any point that is within the roadway-radius of a point in the model center-line path, is part of the base roadway region. A deviation roadway region consists of a base roadway region combined with all points within a predetermined distance (for example, 75 feet), of any point in the base roadway region.

In some embodiments and in some circumstances where a target asset is designated as roadway-bound, an allowed region of deviation for the target asset is bounded by an intersection of a circular region having a size based on a predicted or planned distance between a tracking asset and the target asset, and a deviation roadway region that comprises the whole of a predicted path (on the roadway) of the target asset. In some embodiments this creates an allowed deviation region, at a point in time, which consists of a narrow region about a highway from wherever the deviation roadway region enters a circle, about the currently planned position of the asset, to where it exits that circle. In some embodiments, if the tracking and target asset are sufficiently near each other, the circle will be smaller than the full width of the deviation roadway region. In such a circumstance the intersection of the two regions comprises the whole of the circle.

In some embodiments the notion of roadway-bound extends to railways. In some embodiments, the notion of roadway-bound extends to trails, including wilderness trails. In some embodiments, the notion of roadway-bound is extended to any path across the surface that is likely to be preferentially used over random paths or momentum-based predictions. The likelihood of using a preferred path is learned by analysis of past history of assets' movement across that same surface. It is in particular learned, using modified machine learning algorithms, from past behavior of the same asset. Thus, in some embodiments and circumstances, past behavior of other assets moving across the surface can establish a preferred path; but if there is enough history for a particular asset in question, then a preferred path or trail for the particular asset will take precedence over a general preferred path or trail. For example, many living things as well as programmed things are typically habitual to some degree, and movement habits can be learned from a history of movement, and then used later to usefully predict future movement. In some embodiments, to the extent that such predictions are accurate, battery life and bandwidth are conserved.

For example, consider an asset that is approaching an intersection, and past behavior of that particular asset indicates that the asset will likely turn onto a generally less travelled road. Even though most assets usually continue straight, it may be probabilistically reliable that the particular asset will turn, so the previously made turns can be used to beneficially predict another turn as the asset approaches the intersection.

BRIEF DESCRIPTION OF THE DRAWINGS

Exemplary embodiments are illustrated in referenced figures of the drawings. It is intended that the embodiments and figures disclosed herein be considered illustrative and exemplary rather than limiting.

DETAILED DESCRIPTION

Figure 1:
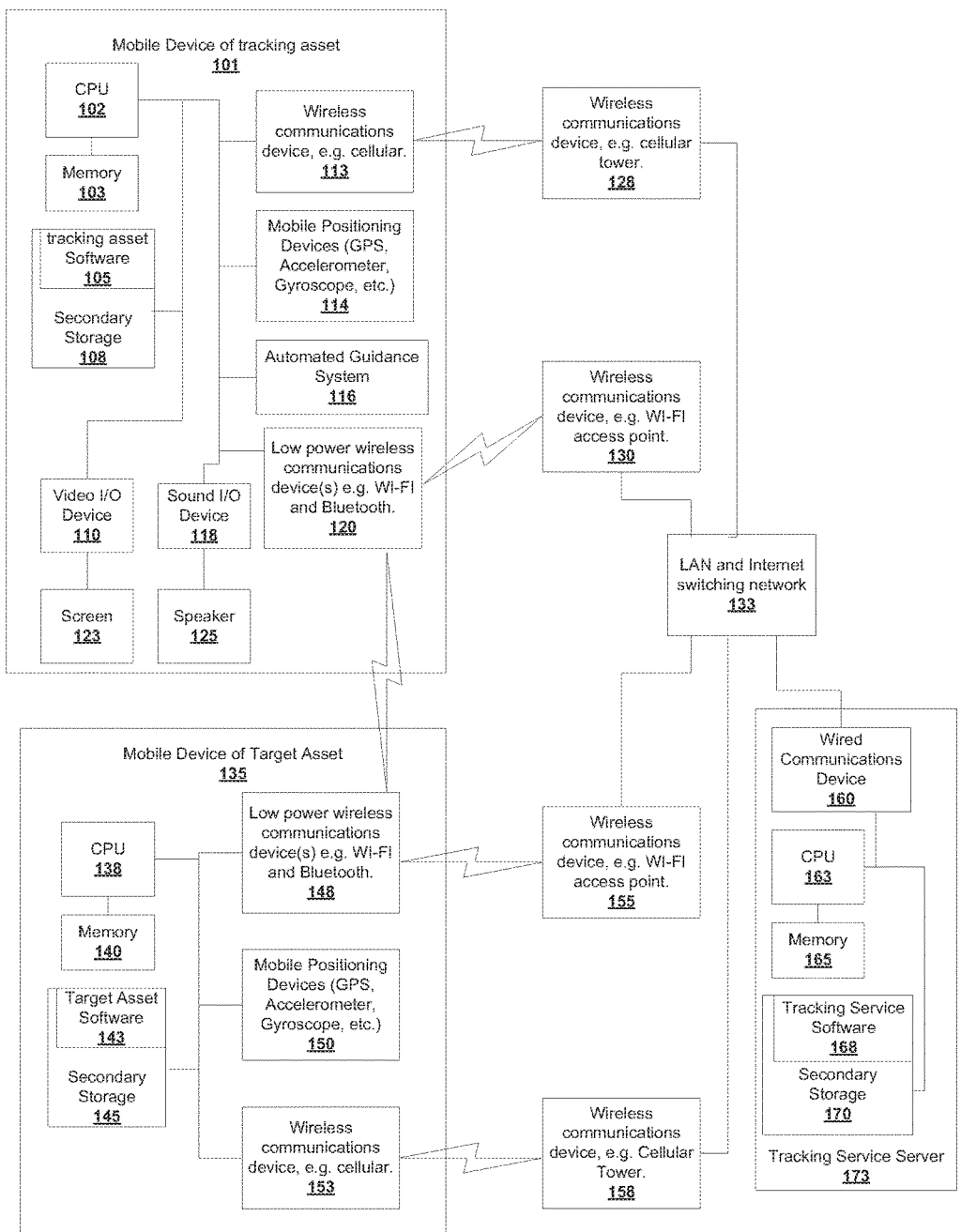
FIG. 1 illustrates a physical architecture for realizing some embodiments, including wired and wireless communications capabilities of an electronic communications network that send and receive messages between elements of the physical architecture.

FIG. 1 illustrates a physical architecture for realizing example embodiments, including wired and wireless communications capabilities of an electronic communications network that send and receive messages between elements of the physical architecture. Several embodiments of the described technology are presented in detail in reference to the Figures. The computing devices on which the described technology may be implemented may include one or more central processing units, memory, input devices (e.g., keyboard and pointing devices), output devices (e.g., display devices), storage devices (e.g., disk drives), and network devices (e.g., network interfaces and radios). The memory and storage devices are computer-readable storage media, e.g., storage media that are non-transitory, that may store instructions that implement at least portions of the described technology. In addition, the data structures and message structures may be stored or transmitted via a data transmission medium, such as a signal on a communications link. Various communications links may be used, such as the Internet, a local area network, a wide area network, relatively low-power wireless technologies such as WI-FI and Bluetooth, and relatively high-power cellular technologies. A tracking device may have automated guidance. For example, driverless cars or airborne auto-piloted vehicles or drones.

A mobile device 101,135 of a tracking asset typically comprises a central processing unit (CPU) 102,138 connected to transitory memory 103,140 and persistent memory 108,145 containing sequences of computer executable instructions 105. The sequences of computer executable instructions 105,143 are executed to provide the functionality of a tracking asset or target asset as described herein. Low-power wireless communications devices, such as WI-FI and Bluetooth 120,148, may be used for direct communication between a tracking and target asset. Such communication, instead of, for example, higher power consumptive cellular devices 113,128,153,158, has the benefit of saving battery power. In some embodiments a tracking device is powered by a generator of a powered vehicle that comprises or is connected to the mobile device 101. However, typically such a mobile device will be powered by a system that includes a battery that is either internal or external to the device even if a generator is also used. In some embodiments such a system also comprises an internal battery, an external battery (such as an automobile battery), as well as generator power when the system is underway. This occurs, for example, when the embodiment mobile device of the tracking asset is a smartphone, the tracking asset is a person, the smartphone is plugged into an automobile charging system, the smartphone is being used via output devices 123,125 to the person to navigate to a target asset (such as a pet or another smartphone), and the automobile is underway. The positioning systems 114, 150 are used to obtain positioning information for the tracking asset and target asset.

If an embodiment mobile device of a tracking asset comprises automated guidance systems 116 for navigating, and there is no human pilot for the mobile device, then the mobile device 101 of some such embodiments might not have a use for or comprise visual output devices 110,123 or audio output devices 118,125. In some embodiments a tracking asset is a human and the mobile device 101 in such embodiments might not have a use for or comprise an automated guidance system 116.

When sufficiently nearby, low power mobile wireless devices 120,148 can communicate directly between a mobile device of a tracking asset 101 and a mobile device of a target asset 135. However, they can also communicate with sufficiently nearby communication nodes 130,155 that provide wired connectivity to a larger communication network such as the Internet. Similarly, mobile cellular devices 113,153 connect typically in some embodiments with cellular towers 128,158, which in turn provide wired connectivity to cellular networks and ultimately to a widely connected network 133. In some embodiments a wide connected network, which may include the Internet 133, provides connectivity between a tracking asset and a target asset. In some embodiments the widely connected network 133 also provides connectivity between tracking service servers 173, a tracking asset 101, and a target asset 135.

Some embodiments include a tracking service that comprises one or more computational resources, such as servers 173, which may be virtual servers or servers provided by various forms of cloud-based services. In some embodiments a tracking service server comprises a CPU 163, transient memory 165, and persistent memory sometimes called secondary storage 170. For communication, in some embodiments, a tracking service server comprises a wired communication device 160 providing connectivity through a wide area network 133, such as the Internet 133, to tracking and target mobile devices 101,135.

In some embodiments, well-known Kalman filter techniques are used to track assets with inertial systems and to employ fusion of externally acquired positioning information, such as via a GNSS (e.g., GPS) system, as described for example in Kyle M. Smalling. &Kenneth W. Eure, *A Short Tutorial on Inertial Navigation System and Global Positioning System Integration*, NASA TECHNICAL MEMORANDUM, NASA-TM-2015-218803, Jan. 9, 2015 (hereinafter "Smalling-Eure"). Complete solutions of hardware and software are available for such data fusion systems that use both inertial positioning (i.e., localized measurements with no radio involved), and external positioning (e.g., GNSS systems including GPS). In parts of what follows such a GPS system is described, those skilled in the art will appreciate that the teachings apply to the other GNSS systems, including devices that may use multiple GNSS systems, and other observation techniques that depend on external resources such as radios or that are otherwise relatively expensive in power to use or intermittent in application relative to relatively high-speed inertial techniques.

A GPS user equipment ("UE") device used in the example embodiment is low-power and uses less than 15 milliamperes (mA) when actively producing location information. Most of the time, in the example embodiment, the GPS is shut down to save power between the times that GPS data is required. Nevertheless, the GPS will typically have been run sufficiently in the last two hours to have currently valid ephemeris data, so that time to first fix ("TTFF") is under one second from the time when the GPS is fully turned back on. As soon as both position and velocity are obtained from the GPS, it is most often again shut down. The one second hot-start TTFF number is met by multiple devices from multiple manufacturers. In some embodiments and in common active tracking circumstances, this reduces power consumption of the GPS to two percent or less of the active power consumption of the GPS. Thus, a normally 15 mA GPS device that has a fast hot-start (low TTFF when valid GPS ephemeris data is in memory), is generally less than 300 micro-amperes (μA) on average in some embodiments.

Every two hours in the example embodiment, the GPS is run continuously, for typically under 30 seconds, until fresh ephemeris data is obtained. In some embodiments, other necessary GPS data is obtained directly from satellites or from a terrestrial source like a cell tower according to public standards for disseminating such data. This occurs at the intervals required by the GNSS technology in use. In other embodiments, ephemeris data is predicted via calculation on the UE device with sufficient accuracy that hours or days can go by without receiving fresh ephemeris data from the satellites. In the example embodiment, a modern system on a chip ("SOC") device is used for the needed computational capabilities, which consumes ultra-low power, and the GPS alone consumes more than these other devices combined unless it is beneficially turned on and off intermittently as described.

Other major consumers of power are radios used to communicate data to other terrestrial devices, such as a cellular network radio, which when used normally is highly consumptive of power even when idle. In the example embodiment, transmissions and receptions of actual data are limited as described in detail below. In addition, in the example embodiment, the idle power consumption of the radio is limited by use of the LTE PSM (Power Saving Mode) or the LTE eDRX (Extended Discontinuous Reception) mode of the LTE-M1 standard published by The 3rd Generation Partnership Project (3GPP). If neither of these modes is supported by the currently used cell tower, then in the example embodiment the target device turns off its cellular radio as a listening device for periods of time. Simply turning off the target device cellular radio has a disadvantage of necessarily re-joining the network whenever listening is desired. However, the LTE PSM or LTE eDRX are not implemented everywhere, so a default behavior is to turn off the radio after informing a tracking service of a duration over which it will not listen, as seen with reference to FIG. 9.

In some embodiments, estimates of inaccuracy are continuously maintained along with estimates of position and velocity. In principle, all that is needed to do away entirely with taking periodic GNSS readings is a sufficiently accurate and stable three axis accelerometer and three axis gyroscope. With such accuracy, GNSS readings could be taken on power-up to obtain an initial position and velocity, and thereafter the accelerometer and gyroscope, by dead-reckoning, would provide position, velocity, and in some circumstances even heading information to the needed accuracy. However, existing highly accurate inertial systems are generally expensive, bulky, and power consumptive. Internal augmentation of simple accelerometer and gyroscope based dead-reckoning, i.e. without the use e.g. of a GNSS system, includes incorporation of other sensor data; for example, internal magnetometer and altimeter data are used to stabilize drift in inertial systems. Various external positioning systems are also used in place of GNSS, e.g. land based radio positioning systems like Loran. All of these data can be combined effectively to obtain more accurate position and velocity information than is obtainable with one system alone. Kalman filters are used to combine such information and typically provide both sufficient accuracy and efficiency. Kalman filters are computationally efficient relative to most other Bayesian filters. Other more generally applicable Bayesian filters are used in some embodiments; for example, the well-known Bayesian particle filter technique is used in some embodiments to combine such data. When only internal sensors (e.g. sensors that are not receiving radio signals or other communications from outside a device) are used to create a location or velocity estimate from a prior estimate, which prior estimate may have been made by internal and/or external means, then we write that the estimate is made by extended dead reckoning. Estimation by dead-reckoning is an example of estimation by extended dead reckoning.

In some embodiments a technique presented in the paper H. Han, J. Yu. H. Zhu, Y. Chen, J. Yang, Y. Zhu. G. Xue, and M. Li. "Senspeed: Sensing driving conditions to estimate vehicle speed in urban environments", in INFOCOM, 2014, is used to provide additional accuracy to dead reckoning; the technique is called SenSpeed. SenSpeed is presented as a way to augment GPS data that is continuously taken, without regard to power consumption, at least in part because the technique is presented as a way to more accurately track and navigate automobiles in urban environments where GPS readings are relatively inaccurate. Here we use this technique instead to reduce power consumption by providing additional accuracy between GNSS (e.g. GPS) readings by augmentation of dead-reckoning. We use the same accelerometer and gyroscope data already collected for dead-reckoning to provide input to SenSpeed, which achieves its benefits by using knowledge of the environment of an automobile.

This is of interest in the present context because both tracking and tracked assets will often be in an automobile. Moreover, for our purposes, we expand useful usage to any rolling vehicle or transportation device, such as e.g. a bicycle. SenSpeed uses, as described in detail in the referenced paper, accelerometer and gyroscope data to accurately, without mathematical integration, estimate speed of a vehicle. SenSpeed recognizes when a vehicle is at rest, by observing non-vibration in the accelerometer data, and thus at those times it estimates speed to be zero. SenSpeed recognizes when a vehicle is in a turn by accelerometer and gyroscope data and uses that data to directly estimate speed from the centripetal force and angular velocity that are directly sensed by an accelerometer and a digital gyroscope respectively. SenSpeed recognizes movement over a bump by correlation of accelerometer sensor output (bouncing) wave-forms that represent when a front wheel hits the bump and when a rear wheel hits the bump; the time between the correlated wave-forms and the distance between the front and rear wheels provide a direct (i.e. again without mathematical integration) calculation and estimate of speed.

In some embodiments, SenSpeed is used when a tracking or tracked device is carried on a rolling transportation device, to provide such accurate speed estimates. In some embodiments, combining of these speed estimates with other positioning information is performed to provide more accurate position and velocity estimates. In some embodiments the combining is performed by Kalman filter and extended Kalman filter techniques. In some embodiments, the combining is performed by other filter techniques, such as a Bayesian particle filter.

In some embodiments, SenSpeed computations are continuously performed as an augmentation to dead-reckoning. If a device is not on a rolling transportation vehicle, then bump correlations are almost never found. Similarly, if not on a rolling transportation device, the accelerometer centripetal force and gyroscope angular velocity data generally do not correlate to provide useful speed information. In some embodiments, an extended Kalman filter is used and the dynamic variance of the SenSpeed estimates is tracked by well-known techniques in the filter itself; in some such embodiments the code is oblivious as to whether or not the tracked or tracking devices are carried by a rolling transport device; this is possible because the SenSpeed output is itself observed over time for accuracy and the combining is thereby dynamically adjusted for that observed accuracy. In some embodiments, the three methods of SenSpeed speed estimation are treated as having distinct variances, i.e. as having distinct expectations of accuracy and thus essentially as three distinct sources of speed information when combining that information with other information.

In many of the known Kalman filter-based data fusion techniques, an estimate of variance of location in a navigation frame (e.g., north-south, east-west, and up-down dimensions) for each dimension is typically in position 1,1 of a covariance matrix for that dimension with an estimate of variance for speed in position 2,2 of a covariance matrix for that dimension. Regardless of where these periodically updated variance estimates are, in the example embodiment these estimates are used to provide a 90% probability region about the asset. Square roots of the corresponding variances are taken to obtain an estimate of standard deviation for each dimension. When two orthogonal horizontal dimensions have approximately the same normal distribution, a circle with a radius of about 2.5 sigma (or 2.5 times the standard deviation for one dimension) provides a 90% probability of containment for the 2-dimensional region.

Figure 2:
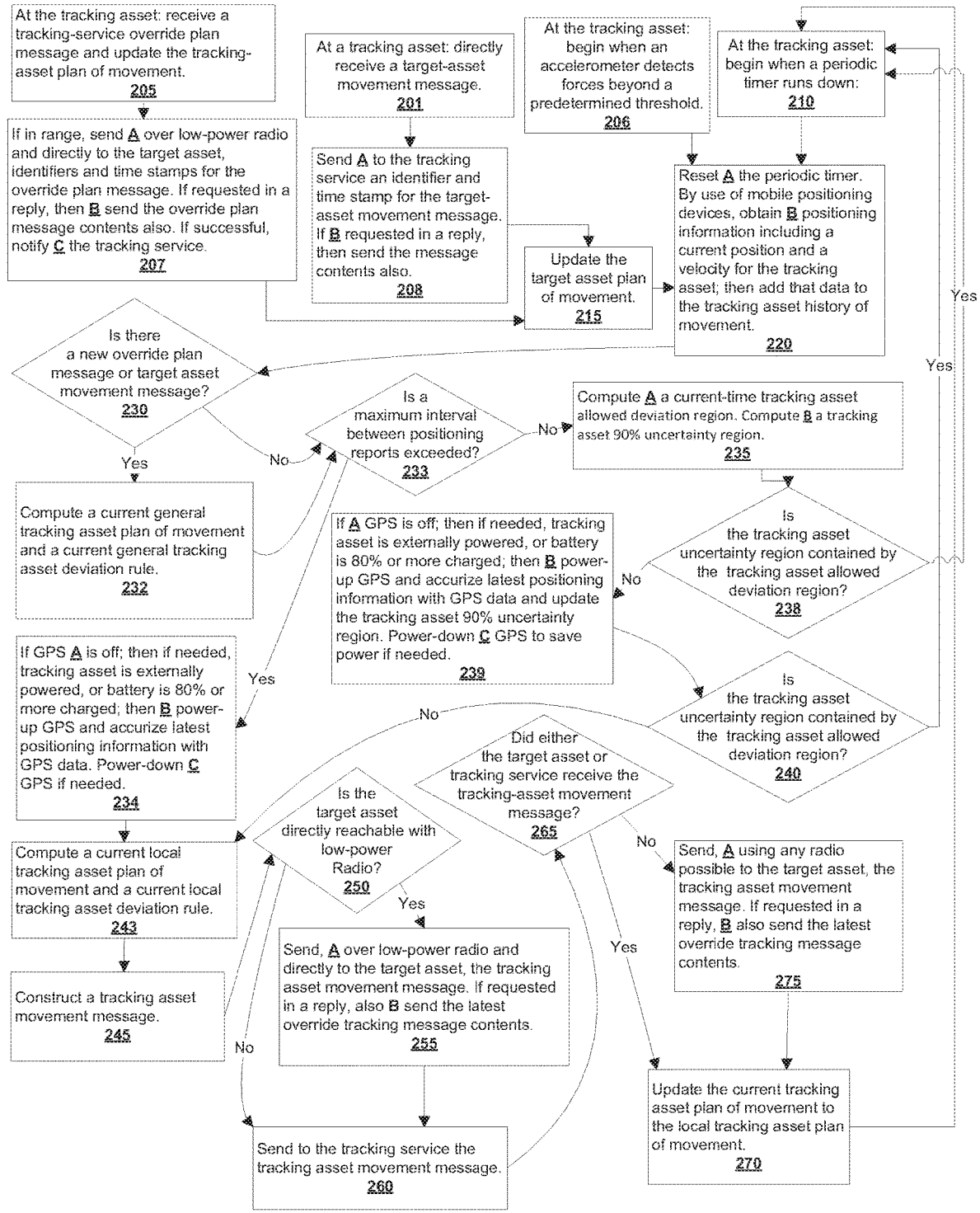
FIG. 2 illustrates a tracking asset receiving movement plans, creating movement plans, and using movement plans for determining when to update current information for the tracking asset.
Figure 3:
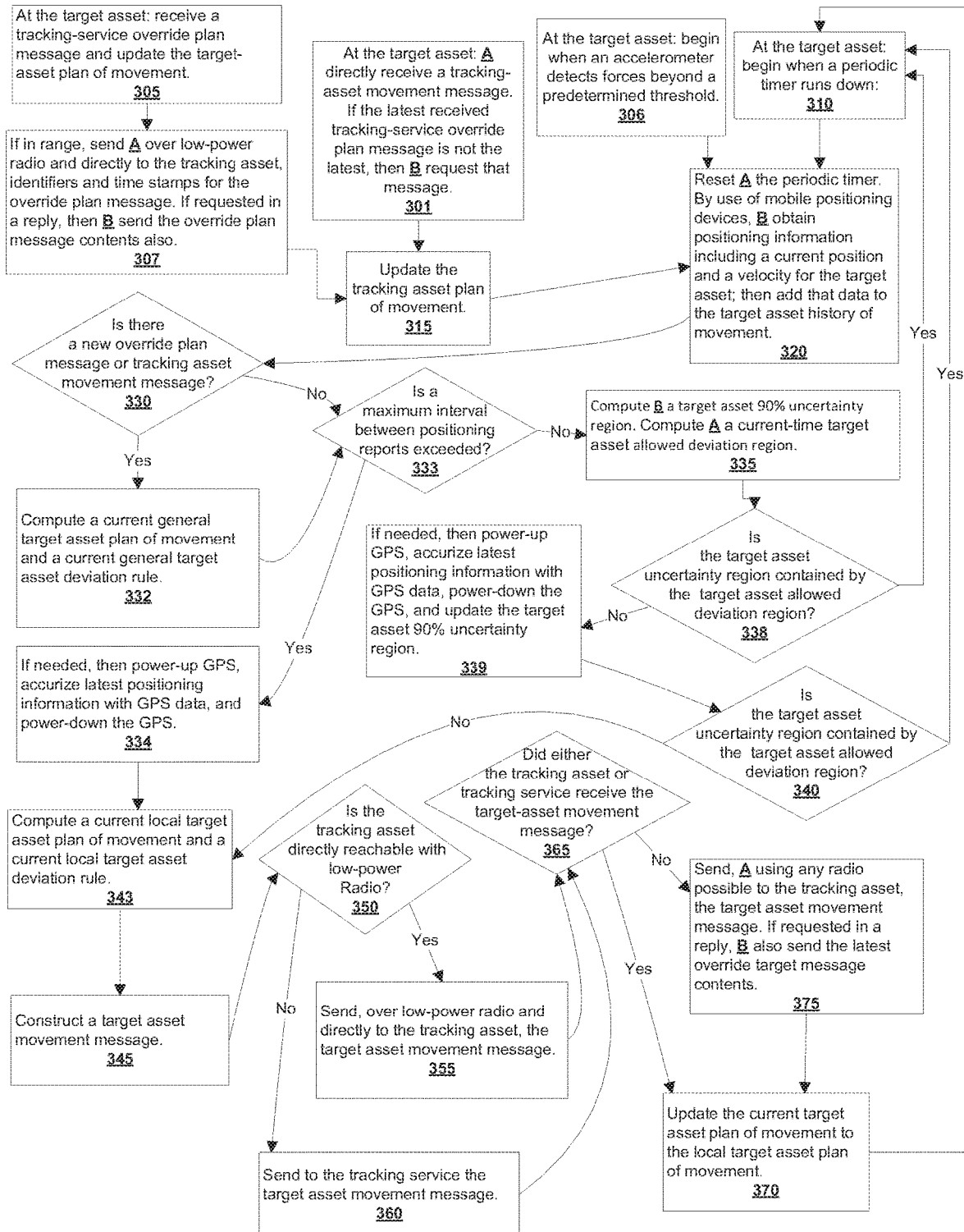
FIG. 3 illustrates a target asset receiving movement plans, creating movement plans, and using movement plans for determining when to update current information for the target asset.

With reference now to FIGS. 2 and 3, this is what is used for inertial system 90% uncertainty regions 235,335, when the allowed deviation region is approximately circular. The larger of the two variances for the horizontal dimensions is used. In the example embodiment, if the allowed deviation region is heavily elongated or otherwise one dimensional (in any direction or possibly with a curvature or turn), as can be the case for a prediction of movement along a roadway, then only one deviation dimension is actually in play (regardless of twists and turns) and the 90% uncertainty region used is a circle with a radius of 1.5 sigma (or 1.5 times the standard deviation for one dimension). After incorporating a GPS value according to a Kalman filter fusion technique, such as Algorithm 3 of Smalling-Eure, a covariance matrix will have the updated estimation of positional variance, but it will generally be lower variance than before the fusion step, and thus a GPS accurized uncertainty region is calculated. In the example embodiments this occurs identically in each of FIGS. 2 and 3, at 239 and 339, respectively.

In some embodiments a more complex frame of reference is used than in Smalling-Eure. Rapid movements at a global scale may occur for some assets and a more or less flat-earth assumption introduces error. Those skilled in the art will appreciate that these teachings apply to more complex computations utilizing more accurate models and frames of reference. However, the computational cost rises. In many applications, devices move slow enough and get a GPS fix sufficiently often that inertial computations are essentially unaffected by inaccuracies in the model like the curvature of the earth. In such cases the additional computational complexity does not provide a benefit to offset the additional power used. Nevertheless, in some embodiments highly accurate inertial systems are used that utilize more complex frames of reference. Such systems can be more expensive and consume more energy for both more accurate inertial devices and the computations. Nevertheless, such systems will result, according to the teachings herein, in lower power used by the GPS system because a corresponding process covariance matrix for such systems (a measure of error described below) has smaller coefficients. Such accurate positioning systems also reduce transmission power costs regardless of the power costs of the positioning equipment.

Kalman filters are an effective way to fuse data from more than one sensor mechanism, and are used ubiquitously for both simple and complex fusion techniques of GPS and inertial positioning alike. In some such embodiments the devices are state of the art with data fusion controlled by an Extended Kalman Filter (EKF); in other embodiments the devices are simple as described in Smalling-Eure. In some such embodiments a Kalman filter provides an estimate of the expected variance for the process at any point in time as discussed above. In other embodiments, a Kalman filter is not used and instead a simple linear estimator based on the number of samples (a measure of time) for the expected variance is used. In some such embodiments, the starting variance at each point in time where a GPS fix is used, the variance is reset to the variances of a GPS fix (i.e., the GPS position is fused with inertial data by simply taking the GPS data as-is at each point having GPS data, and a simple one-dimensional or multi-dimensional linear estimator of positional variance is used at each step having only inertial data after that). In other embodiments, a manufacturer's guarantee of drift over time is used to estimate a maximum expected error for an inertial system.

An estimated error is used beneficially as described in FIGS. 2 and 3 to determine when to obtain a GPS fix, because a continuously run GPS device can consume more power than an inertial device. Moreover, current research funded by The Defense Advanced Research Projects Agency ("DARPA") and others promises increasing accuracy in ever more efficient, accurate, and cost-effective inertial systems. This will occur, in part, because of the vulnerability to attacks on GNSS and in particular the United States' GPS infrastructure-military systems simply must work better, at lower cost, and over longer periods without GPS fixes. However, they do this only because they must work without the system available, whereas here a new mode of operation is used whereby GPS fixes that could be obtained by a device are deliberately not obtained, so that the GPS power consumption can be essentially eliminated for periods of time until a GPS fix is programmatically determined to be beneficial or necessary, which is determined in part from data coming out of the inertial system. Thus, the behaviors of FIGS. 2 and 3 are beneficial for some current inertial devices and will become increasingly more beneficial as new and more robust, precise, efficient, and cost effective inertial devices come to market.

In some embodiments, including the example embodiments of FIG. 2, when sufficient external (non-battery) power is available to a target device, or if its battery is more than a predetermined amount charged (e.g., 80%), then the GPS is not turned off; instead it is allowed to run freely, which in some Kalman filter embodiments continuously provides full accuracy capabilities of the GPS and inertial systems combined.

FIG. 2 illustrates a tracking asset receiving movement plans, creating movement plans, and using movement plans for determining when to update current movement plans for the tracking asset. In some embodiments this activity starts by one of four events: 1) receiving a target asset movement message 201 from a target asset; 2) receiving a tracking-service override plan message 205; 3) an accelerometer 206 detects accelerative forces beyond a predetermined threshold; and 4) a periodic timeout 210 that occurs, for example, at an interval that in some embodiments is measured in milliseconds. In some example embodiments the interval is 1 second, or 1,000 milliseconds. In other example embodiments, a low-power accelerometer 150 is used to estimate movement based on measured accelerative forces and begins when the accelerometer 150 detects forces beyond a predetermined threshold 206. In some such embodiments, the periodic interval 210 used is in tens of seconds or longer and the accelerometer 150 is used to start the activity sooner when a pre-set estimation of movement has been exceeded. The accelerometer mechanism can save significant amounts of power by doing nothing until there is a force sufficient to change momentum for the asset. Moreover, since the inertial system is lower power than a continuously running GPS system, the positioning information 220 obtained is, in some embodiments and until an estimated error exceeds a threshold, less consumptive of power.

In this example embodiment, the tracking-service override plan message 205 that is received comprises: 1) a plan of movement for the target asset; 2) a plan of movement for the tracking asset; 3) a hash based identifier for the plan of movement for the target asset; 4) a time stamp for the plan of movement for the target asset; 5) a hash based identifier for the plan of movement for the tracking asset; and 6) a time stamp for the plan of movement for the tracking asset.

When the activity is started by receiving of a tracking-service override plan message 205, and the target asset is in range of a low-power radio, the identifiers and time stamps of the message are forwarded to the target device using the low-power radio 207A. By comparing the identifiers and time stamps, the target device determines if it already has that information and, if not, then it replies with a request that the content also be sent. If a response contains such a request then the tracking device sends the contents of the tracking-service override plan message to the target asset using the low-power radio 207B. If all of the above succeeds over low power, then the tracking service is notified that the tracking-service override plan message made it to the target asset 207C. This behavior ensures that tracking a target asset can occur, with assistance from a tracking service, even if the target asset does not have connectivity (except through a tracking asset) with the tracking service. In some embodiments, such connectivity through a tracking device is used to avoid more expensive communications, which depend on a more power consumptive radio between a target device from a tracking service. Features of this example embodiment include that: it can function with or without connectivity to a tracking service; and tracking can occur, with benefits of tracking service connectivity, if there is low-power connectivity to the target device (from the tracking device directly) and the tracking device has connectivity with the tracking service.

When the activity is started by directly receiving from a target device, over a low-powered radio, of a target-asset movement message 201, then a hash-based identifier and time stamp for the message is forwarded to a tracking service 208A. By comparing the identifier and time stamp, the tracking service determines if it already has that information and if not then it replies with a request that the content also be sent. If a response contains such a request then the tracking device sends the contents of the target-asset movement message to the tracking service 208B.

This behavior by a tracking device in this example embodiment, of forwarding information between a target device and a tracking service in both directions, ensures that tracking a target asset can occur, with assistance from a tracking service, even if the target asset does not have connectivity, except through the tracking device, with the tracking service. In some embodiments, such connectivity through a tracking device is attempted first, when target devices and tracking devices are in range, to avoid more expensive communications that depend on more power-consumptive radios. Features of this example embodiment include that: it can function with or without connectivity to a tracking service, and tracking can occur with benefits of a tracking service if there is direct low-power connectivity between a target device and a tracking device, provided the tracking device has connectivity with the tracking service and the tracking device and target device have connectivity.

In some embodiments, some or all of the functionality of the tracking service, as presented in this example embodiment, is performed by the computational capabilities of a tracking device itself. In some such embodiments, messages to and from a tracking service as presented in this example embodiment are instead messages to and from a tracking device. Of course, messages between a tracking device and a tracking service need not be transmitted in such embodiments. Instead, messages between a target device and tracking service are between the target device and tracking device in such embodiments. For example, modern smartphones can have significant storage capabilities as well as powerful computational capabilities and can perform such tracking service tasks. Observe that the smartphone in such embodiments, unlike a tracking service, would not be required to support a large multiplicity of simultaneous tracking activities. In some such embodiments, a smartphone, as a tracking device and tracking service combined, utilizes outside support to supply data from a mapping database. The smartphone tracking device in some such embodiments downloads detailed information as-needed for a tracking activity. (e.g., navigational maps for the area or areas where a target and a tracking device are located). Such embodiments ensure that the data is as up-to-date as possible whenever it is used and beneficially avoids smartphone involvement in keeping a massive on-board database up-to-date.

In some embodiments, tracking devices include dedicated GPS navigational systems that, for example, may not support phone calls, unlike smartphones. In some such embodiments, tracking devices exhibit a similar gamut of functionality as smartphones in that some use a tracking service (as presented in the example embodiments), others function as a tracking service, and others offload some functionality of a tracking service while performing other functions, such as those described above for smartphones.

Those skilled in the art will appreciate that for some messages, such as the sending over low-power radio directly to the target asset 207A, identifiers and time stamps for the override plan message are unnecessary in circumstances where a tracking device is also performing the functions of a tracking service, since the tracking device would already be aware of whether a target asset had been sent and had received the identified contents of an override plan message.

In some embodiments, a tracking asset provides a target asset with general electronic communications network access. In some such embodiments, the tracking asset acts as a WI-FI or Low Energy Bluetooth access point for the target asset when it is in range, and thereby provides the target device with general Internet access over a low-power radio. Acting as an access point in this manner can be more consumptive of bandwidth between the target device and the tracking device. Nevertheless, it is low-power bandwidth and can provide power savings for the target device.

If a target asset plan of movement was received directly from the target device 201 or in a tracking service override plan of movement 205, the target plan of movement used by the tracking device is updated with the received information 215. In this example embodiment, a directly received target plan of movement will be a simple plan generated by the target device. From a tracking service may come a more involved plan of movement. For example, from the tracking service may come a plan that follows a roadway.

In some embodiments where a target device is not also a navigational aid, such as where a plan of movement is a prediction only and not a suggestion or a navigational direction of movement for the target device, the target device does not have hardware or software needed to present maps to a user or to correlate mapping information with observations made by the target device as in pilotless navigation. The target device instead performs relatively simple computations that observe adherence to the plan of movement while being beneficially oblivious (such as to whether the plan may follow a roadway).

In this example embodiment, both a tracking device and target device are tracked by a tracking service. While a target device or asset is a target of a tracking device or asset, the tracking device or asset in turn is a target of the tracking service. However, unlike the target device in the example embodiment, the tracking device in the example embodiment receives navigational direction or suggestion from the tracking service. In some embodiments the navigational direction is also used as a prediction of future movement for the tracking asset. As a target of the tracking service, the tracking device beneficially reduces its own transmissions, similarly to a target device.

In some embodiments the only target device is the tracking device as a target of the tracking service (as presented in the example embodiment). The example embodiment teaches for these embodiments also by elimination (in the example embodiment) of all messages to and from the target device. However, just as in the example embodiment, the tracking device receives navigational direction or suggestion from a tracking service. In such embodiments, there may be either a stationary or moving target destination, but there is no target device transmitting from that stationary or moving target destination. In such embodiments, a tracking device (as described in the example embodiment) beneficially avoids power-consumptive transmissions to the tracking service when the tracking device has adhered sufficiently to navigational direction (such as movement prediction) from the tracking service. This feature is beneficial, for example to automobile navigation, by a user through his smartphone as a tracking device and a mapping service as a tracking service. As noted earlier, users often do not have the means to charge their smartphones when navigating and even when they do, they often find it convenient to use smartphones without cables attached.

The periodic timer is reset regardless of how the activity was initiated 220A. Thus, it is possible for arbitrarily many iterations of this activity to occur without it being initiated by a timeout 210. Current positioning information for the tracking asset 220B is obtained from positioning device(s) 114.

Figure 7:
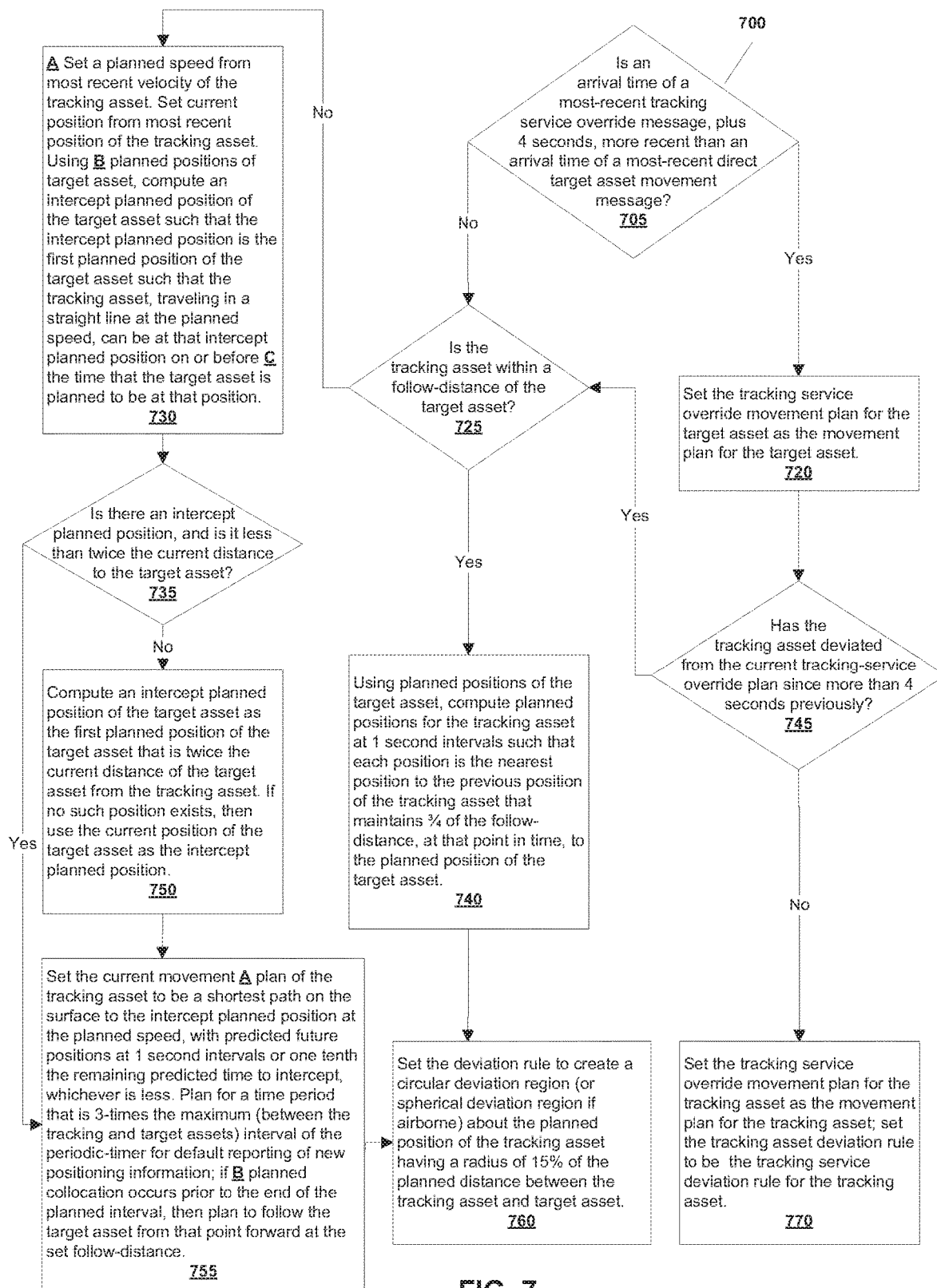
FIG. 7 illustrates computation, by a tracking asset, of a current tracking asset plan of movement and a current tracking asset deviation rule.

Provided the process illustrated by FIG. 2 was initiated by a message 201, 205, whereby there is new target asset information 230, a current general tracking asset plan of movement and deviation rule 232 is computed; which computation is presented in detail as the process 700 of FIG. 7. The computation utilizes the currently known plans of movement for the target asset, which may have come from the target asset or from a tracking service. Also, any plan of movement for the tracking asset that has come from a tracking service is used as-is, provided it has been received sufficiently recently (as seen in FIG. 7).

If a maximum interval between transmissions of fresh positioning information is exceeded 233 and the GPS is powered down 234A, then if the tracking asset is charging, connected to external power, has an 80% or more charged battery, or the current estimated variance of position or velocity can be improved by more than a predetermined amount (e.g., 30%) by obtaining a GPS fix, which in this example embodiment is determined by pre-computing a Kalman filter fusion or update step for adding in GPS data, then the GPS is powered up and GPS positioning (in this example embodiment, or in others the most accurate positioning device available) is used to obtain the latest GPS positioning information for the tracking asset 234B. If there is no external power and the battery is less than 80% charged, then the GPS is turned off again 234C. The new GPS positioning information is incorporated into estimates of position and velocity according to a Kalman filter technique as described previously. In this example embodiment, the obtained GPS positioning information beneficially makes more accurate the current estimated positioning information.

If a maximum interval between transmissions of fresh positioning information is not exceeded 233, then a current-time tracking asset allowed deviation region is computed 235A and an estimated tracking asset 90% uncertainty region is computed 235B. The tracking asset allowed deviation region computation uses current time; a planned current position of the target asset linearly interpolated from the plan of movement for the target asset last received; a planned current tracking asset position, interpolated from a plan of movement; and a tracking-asset deviation rule. This computation is performed using information that is also available to the target asset and, if applicable, a tracking service. Deviation rules that have been generated by the tracking asset itself, in this example embodiment whereby there is an external tracking service, create a deviation region that is circular about the planned position of the tracking asset and having size dependent on the planned distance, at the current time, between the target asset and the tracking asset. However, deviation regions based on deviation rules from a tracking service are in some embodiments beneficially more complex. For example, a deviation rule from a tracking service in some circumstances will be that as long as a tracking asset is within 75 feet of any future planned position according to the plan of movement, which perhaps is any position along a roadway extent of many miles, then there is no transmission of new positioning information from the tracking asset until a maximum interval between such transmissions of fresh positioning information is exceeded 233. In some such embodiments, the removal of predicted path (e.g., roadway) from the computation of allowed deviation region occurs when the tracking device observes, based on electronic positioning devices 114, that it has progressed past a position in the predicted path. This beneficially causes a part of the process of FIG. 2 to begin if a tracking asset reverses direction and heads back the other way, which starts with a computation of a local plan of movement 243 and then communication of that information with a tracking service 260.

It is common for automobiles piloted by a human driver, as an example tracking asset type, to come to complete stops, most often because of traffic. But as long as the intention of the driver is to continue forward according to a plan already received, then there is no need in the example embodiment for a tracking service to be informed of a slow or fast rate of progress. Nevertheless, it is beneficial to know when a driver no longer intends to, or is no longer able to, continue according to an existing plan, and reversing direction is just as effective of an indicator of that circumstance as is driving entirely off of a planned roadway path. The 90% uncertainty region is computed according to the variances for position 235B described previously. The estimated accumulated error grows with each successive data point that is projected using inertial positioning devices. But when it has grown large and a GPS positioning data point is taken then it typically partially collapses. As noted previously, commercially available GPS devices differ in accuracy by multiple orders of magnitude, so the initial estimated error after a GPS data point is taken can likewise differ by multiple orders of magnitude, depending in part on the construction of the device.

Mapping services have an interest in knowing the rate of progress of vehicles over roadways. For example, with such information they can more effectively plan routes for other vehicles. In the example embodiment such information is transmitted to a tracking service (also a mapping service) whenever a maximum interval is exceeded 238, which ensures that such information at the tracking service is no older than the maximum interval. In some embodiments, a tracking service sets a maximum interval when it sends deviation rules to assets. In some embodiments, deviation rules from a tracking service comprise a minimum, a maximum, or both a minimum and maximum rate of progress that is expected along a planned path. For these embodiments the allowed deviation region grows in the forward direction over time and shrinks in the rearward direction. In some embodiments, a minimum or maximum rate of progress is comprised by a deviation rule, and is compared to an average rate of progress for an asset over a recent period. If the asset is outside the bounds then the asset is counted as outside the allowed deviation region. Thus, in some embodiments, an allowed deviation region comprises constraints on velocity, average velocity, direction of movement, and may have arbitrary shapes (e.g., following a series of roadways) according to a plan of movement. So deviation rules and resulting regions are in general more complex than simple location at a point in time. In some embodiments, a minimum or maximum rate of progress is compared to a weighted average rate of progress for an asset over a recent period of time. In some embodiments, according to a deviation rule an Infinite Impulse Response ("IIR") or Finite Impulse Response ("FIR") filter is applied to a sequence of past positioning information for a tracking asset to achieve a weighted average that establishes a quantified rate of forward progress that is compared to a minimum and maximum rate of progress.

Allowed deviation regions in some embodiments are computed, according to a deviation rule, as logical combinations of other deviation regions. Logical combinations of such regions in some embodiments use primitive operations of set intersection, set union, and set complementation (also called logical set negation). Primitive logical operations in some embodiments are logically describable as combinations of set intersection, set union, and set complementation.

In some circumstances for some embodiments, there is a multiplicity of deviation rules simultaneously applied for a tracking asset, with each deviation rule having its own associated actions. The application of one such deviation rule, as already described and illustrated for an example embodiment in FIG. 2, triggers transmission of positioning information for a tracking asset. Other actions are in some embodiments associated with other deviation rules. For example, a one-time utterance directing a driver to turn right at an intersection is an action associated with a deviation rule that establishes a region along a plan of movement that is sized, dynamically according to the deviation rule from the tracking service and computed by the tracking device itself, to be 4 seconds away or a reasonable stopping distance away, whichever occurs first given current asset velocity at the time of computation, of the intersection edge where the driver will be required to change direction to make the turn. When the tracking asset enters that region, which formally speaking in the example embodiment means it leaves a deviation region consisting of the complement of the region entered, the utterance is expressed audibly to the driver. Note that beneficially, this occurs without any necessity of data transmissions and exchanges between the tracking asset and tracking service during the described activity.

In some embodiments, a plan of movement and deviation rule for transmission of fresh positioning information can allow a tracking asset to approach a vicinity of an intersection, make a turn continuing through the intersection, and progress away from the intersection beneficially without making a transmission of positioning information from the tracking device to the tracking service. Nevertheless, based on another deviation rule with an associated action of making an utterance as described above, a previously received utterance is also beneficially expressed audibly to the driver at precisely the right moment while in the vicinity of the intersection. In some embodiments, navigational utterances associated with deviation rules are transmitted to tracking devices as part of a tracking-service override plan message 205.

In some embodiments and circumstances, a plan of movement beneficially extends beyond a point where a tracking device is explicitly asked to transmit additional positioning information. In such a circumstance, a plan of movement can continue forward through boundaries of a deviation region that has an associated action of transmitting fresh positioning information. In some embodiments this capability allows a tracking service to beneficially withhold some utterances until after a tracking asset has progressed farther along a planned route. When done in this way, the updated positioning information is sent to the tracking service and needed additional utterances are received from the tracking service, which is similar to a transmission based on a timeout in that recipient processes are not alerted in this circumstance that the tracking asset has deviated from an existing plan of movement. In some embodiments, when a tracking asset receives such additional utterances, it also receives an updated plan of movement and a new set of deviation rules with associated actions.

In the example embodiment, planned positions of a tracking asset and target asset are linearly interpolated using a time base between predicted locations. Those skilled in the art will appreciate that other interpolation techniques can be used, and that less densely spaced points in the predicted future can be computed and transmitted with more complex interpolation. However, because the future planning in some embodiments is computed by a tracking service, it is effective to provide more densely spaced points and then use linear interpolation as such paths can be arbitrary. Tracking services may have detailed information about possible routes for an asset, and can predict arbitrary paths of movement. Moreover, when a tracking service is not used, a predicted future movement will in some embodiments simply be a straight line since mobile devices may not have such detailed information. Nevertheless, more complex interpolation techniques may be used without departing from the teachings of this specification.

The current uncertainty region of the tracking asset is determined to either be within the allowed deviation region computed 238 as described in the previous paragraphs, or some part of it is outside it. If it is within it, then this activity loops back and waits for one of the 201,205,206, or 210 events that will again begin this activity.

If the 90% current uncertainty region is in part outside the allowed deviation region 238 and the GPS is powered down 239A, then if the tracking asset is charging, connected to external power, has an 80% or more charged battery, or the current estimated variance of position or velocity can be improved more than 30% by a GPS fix for either horizontal dimension, which in this example embodiment is determined according to any one of many well-known Kalman filter designs for fusion of GPS data with inertial data, (e.g., an Extended Kalman Filter ("EKF"), then the GPS component is powered up and GPS positioning (in this example embodiment, or in others the most accurate positioning device available) is used to obtain the latest positioning information for the tracking asset 239B. If there is no external power and the battery is less than 80% charged, then the GPS is turned off again 239C. The new GPS positioning information is incorporated into estimates of position and velocity according to the Kalman filter process, the estimated error is updated, and the 90% uncertainty region is updated.

Using this potentially more accurate and smaller 90% current uncertainty region, check again and if the 90% current uncertainty region is contained in the allowed deviation region 240, then this process loops back to the beginning and waits for any of the 201,205,206, or 210 initiating events.

If the 90% current uncertainty region is not contained in the allowed deviation region 240, then a current local tracking asset plan of movement is computed 243, which computation is presented in detail as the process 700 of FIG. 7 (but modified slightly such that the first 705 branch always takes the "No" path). It is called local because it does not depend on information or computation from a tracking service, and is instead computed entirely by a tracking device based on information available to it locally. In this example embodiment, that local information does not include a mapping database. In this example embodiment, at any time connectivity can be lost with a tracking service and tracking will nevertheless beneficially continue if there is a communication mechanism that continues to provide message exchange between the target and tracking devices.

Next a tracking asset movement message is constructed 245 that comprises: 1) a hash based identifier and a time stamp for the last received movement plan for the tracking asset, which was comprised by the last received tracking-service override tracking message; 2) a hash based identifier and a time stamp for the last received movement plan for the target asset, which was comprised by the last received tracking-service override tracking message; 3) a recent tracking asset history of movement (since last known receipt of such history by both the tracking service and the target asset), taken from the tracking asset history of movement; 4) the current local tracking asset plan of movement; 5) a tracking-asset deviation rule; and 6) a Boolean indicating whether the tracking asset has deviated from the existing movement plan. The deviation rule is that the allowed deviation region is circular about the current planned tracking asset location and has a diameter of 15% of the planned distance between the tracking asset and target asset at the time of calculation. However, the allowed region has a minimum diameter of four times an estimated standard deviation of the most accurate positioning devices of the tracking asset from its true position. Note that the accuracy of positioning devices, such as GPS devices, can be no better than 50 feet (or even worse) or it can be within 2 inches (or even less), depending on which GPS component devices are used. Because of this wide range of accuracy, it is also useful to have a minimum diameter that is based on the effective size of the tracking asset. If it is a vehicle, then for this example embodiment two lengths of the vehicle is also a minimum diameter for the allowed deviation region. If the tracking asset is a person, then for this example embodiment 12 feet is also a minimum diameter for the allowed deviation region. When not known or not configured, for this example embodiment 12 feet is used as a default minimum.

If the target device is directly reachable with a low-power radio 250, which for this example embodiment means via Bluetooth or WI-FI, then the previously constructed tracking asset movement message 245 is sent to the target device using the lowest power of the low power radios available 255A. In this example embodiment, the Bluetooth radio would be chosen over WI-FI. Note however that an appropriate comparison of power used is not necessarily per time interval but per message. A higher power consumptive technology when compared over equal time periods could be less consumptive for a sufficiently long message because it could get the message to its destination much faster. Devices that can turn on and off their transmission power consumption fast enough could be more efficient even though they consume more power when transmitting over the same time interval.

The target device 301A receives the tracking asset movement message directly from the tracking asset; it also receives an identifier and time-stamp for the latest tracking-service override movement message, and if the target device has not yet received that message, then it 301B requests it directly from the tracking device. If the tracking device receives such a request then it also sends the content of the last received tracking-service override tracking message to the target device 255B.

The tracking device then sends the tracking asset movement message to the tracking service 260. In this way the tracking service receives the latest movement information for the tracking asset, with which it may construct better predictions or directions for the tracking asset.

If neither the target device nor the tracking service receives the tracking asset movement message 265, then an attempt to send the tracking asset movement message to the target device is made using any possible connectivity 275A. In some embodiments, this would be an attempt using the lowest power radio to an in-range electronic communication node that provides connectivity to the Internet. Any of Bluetooth, WI-FI, or cellular networks could be used, depending on current connectivity.

The target device 275A receives the tracking asset movement message and compares the hash based identifiers for the content of the last received tracking-service override tracking message, and verifies that it has already received them. If not, then it requests that content in a reply. If the tracking device receives such a request then it sends the content of the last received tracking-service override tracking message to the target device 275B across the established connectivity from which it received the message The current tracking asset plan of movement, used at the tracking device, is updated to the local tracking asset plan of movement 270. Then the process of FIG. 2 loops back to waiting for one of the events that starts the process of FIG. 2. In particular, it loops back to waiting for the periodic timer to run down 210 or one of the 201,205, or 206 events that will again begin this activity.

FIG. 3 illustrates a target asset receiving movement plans, creating movement plans, and using movement plans for determining when to update current movement plans for the target asset. FIG. 3 is similar to FIG. 2, but it is for a target asset and not a tracking asset. Note that both a target asset and tracking asset are tracked by a tracking service in the example embodiment and in many embodiments both asset types are tracked; so in that sense both target and tracking assets are also targets. Both asset types may, for example, be roadway bound and predicted to progress along a roadway, so much of their behavior is similar. Nevertheless, there are differences and a few are subtle, so a full description for a target asset of the example embodiment is provided for FIG. 3. Some general discussion can be found in the description for FIG. 2 that applies equally to FIG. 3 but is not repeated, and some discussion for FIG. 2 is referenced.

In the example embodiments, the activity of FIG. 3 starts by one of four events: 1) receiving a tracking asset movement message from a tracking asset 301; 2) receiving a tracking-service override plan message 305; 3) an accelerometer detects accelerative forces beyond a predetermined threshold 306; and 4) a periodic timeout that occurs 310 (for example, at an interval that in some embodiments is measured in milliseconds). In some example embodiments the interval is 1 second, or 1,000 milliseconds. In other example embodiments, a low-power accelerometer 150 is used to estimate movement based on measured accelerative forces and creates a 307A event. In some such embodiments, the periodic interval used 310 is in tens of seconds or longer and the accelerometer 150 is used to start the activity sooner when a pre-set estimation of movement has been exceeded. The accelerometer mechanism can save significant amounts of power by doing nothing until an accelerative force sufficient to move the device beyond a predetermined level is detected. Those skilled in the art will appreciate that there are multiple such single-chip devices comprising accelerometers and manufacturers of devices designed to wake up a comprising device in such circumstances. Since such an introspective inertial device does not depend on an external signal, it can save considerable power in many circumstances where the effective alternative is to continuously process GPS signals.

The positioning information 320 obtained is, in some embodiments and until an estimated accumulated error exceeds an error threshold, used to minimize power consumption by postponing GPS signal processing until needed to correct for accumulated error. In some embodiments, an error threshold beneficially depends on an allowed deviation region. For example, the estimated bound or bounds on error is used with the estimated location to create an uncertainty region in which the asset could plausibly be anywhere, but with 90% probability is within the uncertainty region. If any point in the uncertainty region is outside the allowed deviation region, then the asset is considered to be, in effect, outside the allowed deviation region, in which case the GPS may be used to more accurately locate the asset and correct the history for accumulated error from inertial positioning.

In this example embodiment, a tracking-service override plan message that is received 305 has the same structure as a tracking-service override plan message that is received 205 as described for FIG. 2.

When the activity is started by receiving of a tracking-service override plan message 305, and the tracking asset is in range of a low-power radio, the identifiers and time stamps of the message are forwarded to the tracking device using the low-power radio 307A. By comparing the identifiers and time stamps, the tracking device determines if it already has that information and if not then it replies with a request that the content also be sent. If a response contains such a request then the target device sends the contents of the tracking-service override plan message to the tracking asset using the low-power radio 307B. This behavior ensures that tracking a target asset can occur, with assistance from a tracking service, even if the target asset does not have connectivity (except through a tracking asset) with the tracking service. In some embodiments, such connectivity through a tracking device is used to avoid more expensive communications, which depend on a more power consumptive radio, between a target device and a tracking service. Features of this example embodiment include that: it can function with or without connectivity to a tracking service; and tracking can occur, with benefits of tracking service connectivity, if there is low-power connectivity to the target device (from the tracking device directly) and the tracking device has connectivity with the tracking service.

This behavior by a tracking device in this example embodiment, of forwarding information between a target device and a tracking service in both directions, ensures that tracking a target asset can occur, with assistance from a tracking service, even if the target asset does not have connectivity, except through the tracking device, with the tracking service. In some embodiments, such connectivity through a tracking device is attempted first, when target devices and tracking devices are in range, to avoid more expensive communications that depend on more power-consumptive radios. Features of this example embodiment include that: it can function with or without connectivity to a tracking service; and tracking can occur with benefits of a tracking service if there is direct low-power connectivity between a target device and a tracking device, provided the tracking device has connectivity with the tracking service and the tracking device and target device have connectivity.

In some embodiments, some or all of the functionality of the tracking service, as presented in this example embodiment, is performed by the computational capabilities of a tracking device itself. In some such embodiments, messages to and from a tracking service as presented in this example embodiment, are instead messages to and from a tracking device. Of course, messages between a tracking device and a tracking service need not be transmitted in such embodiments. Instead, in such embodiments, messages between a target device and tracking service are between the target device and tracking device. For example, modern smartphones can have significant storage capabilities as well as powerful computational capabilities, and can perform such tracking service tasks. Observe that the smartphone in such embodiments, unlike a tracking service, would not be required to support a large multiplicity of simultaneous tracking activities. In some such embodiments, a smartphone, as a tracking device and tracking service combined, utilizes outside support to supply data from a mapping database. The smartphone tracking device in some such embodiments downloads detailed information as-needed for a tracking activity, such navigational maps for the area or areas where a target and a tracking device are located. Such embodiments ensure that the data is as up-to-date as possible whenever it is used and beneficially avoids smartphone involvement in keeping a massive on-board database up-to-date.

In some embodiments, tracking devices include dedicated GPS navigational systems that may not support phone calls, unlike smartphones. In some such embodiments, tracking devices exhibit a similar gamut of functionality as smartphones in that some use a tracking service, as presented in the example embodiments, others function as a tracking service, and others offload some functionality of a tracking service while performing other functions (such as those described above for smartphones).

Those skilled in the art will appreciate that some messages, such as the sending over low-power radio directly to the target asset of identifiers and time stamps for the override plan message 307A, are unnecessary in circumstances where a tracking device is also performing the functions of a tracking service, since the tracking device would already be aware of whether a target asset had been sent and had received the identified contents of an override plan message.

In some embodiments, a tracking asset provides a target asset with general electronic communications network access. In some such embodiments, the tracking asset acts as a WI-FI or Bluetooth access point for the target asset when it is in range, and thereby provides the target device with general Internet access over a low-power radio. Acting as an access point in this manner can be more consumptive of bandwidth between the target device and the tracking device. Nevertheless, it is low-power bandwidth and can provide power savings for the target device.

The target device 301A receives the tracking asset movement message directly from the tracking asset; it also receives an identifier and time-stamp for the latest tracking-service override movement message, and if the target device has not yet received that message, then it 301B requests it directly from the tracking device. If the tracking device receives such a request then it also sends the content of the last received tracking-service override tracking message to the target device 255B. When the target device receives such a requested tracking-service override movement message, it processes it 305 normally for such a message.

If a tracking asset plan of movement was received directly from a tracking device 301A or in a tracking service override plan of movement 305, the tracking asset plan of movement used by the target device is updated with the received information 315. In this example embodiment, a directly received 301A tracking asset plan of movement will be a simple plan generated and transmitted by the tracking device. From a tracking service may come a more involved plan of movement, for example, from the tracking service may come a plan that follows a roadway.

In this example embodiment, both a tracking device and target device (or their associated assets) are tracked by a tracking service. While a target device or asset is a target of a tracking device or asset, the tracking device or asset in turn is a target of the tracking service. However, unlike the target device in the example embodiment, the tracking device in the example embodiment receives navigational direction or suggestion from the tracking service. In some embodiments the navigational direction is also used as a prediction of future movement for the tracking asset. As a target of the tracking service, the tracking device beneficially reduces its own transmissions, essentially as a target device. Because the plan of movement for the tracking device is also navigational direction, the plan is more likely to be followed for an extended period. While this means that on average, target devices will not need to receive new plans as often as they transmit them, there is a possibility of tracking asset movement plans to change because the target asset movement plans have changed.

In some embodiments the only target device is the tracking device as a target of the tracking service (as presented in the example embodiment). The example embodiment teaches for these embodiments also by elimination (in the example embodiment) of all messages to and from the target device. However, just as in the example embodiment, the tracking device receives navigational direction or suggestion from a tracking service. In such embodiments, there may be a stationary or moving target destination, but there is no target device transmitting from that stationary or moving target destination. In such embodiments, a tracking device (as described in the example embodiment), beneficially avoids power-consumptive transmissions to the tracking service when the tracking device has adhered sufficiently to navigational direction (i.e., movement prediction) from the tracking service. This feature is beneficial, for example, to automobile navigation, by a user through his smartphone as a tracking device and a mapping service as a tracking service. As noted earlier, users often do not have the means to charge their smartphones when navigating and even when they do, they often find it convenient to use smartphones without cables attached.

The periodic timer is reset regardless of how the activity was initiated 320A; thus, it is possible for arbitrarily many iterations of this activity to occur without it being initiated by a timeout 310. Current positioning information for the target asset is obtained 320B from positioning device(s) 150.

Figure 8:
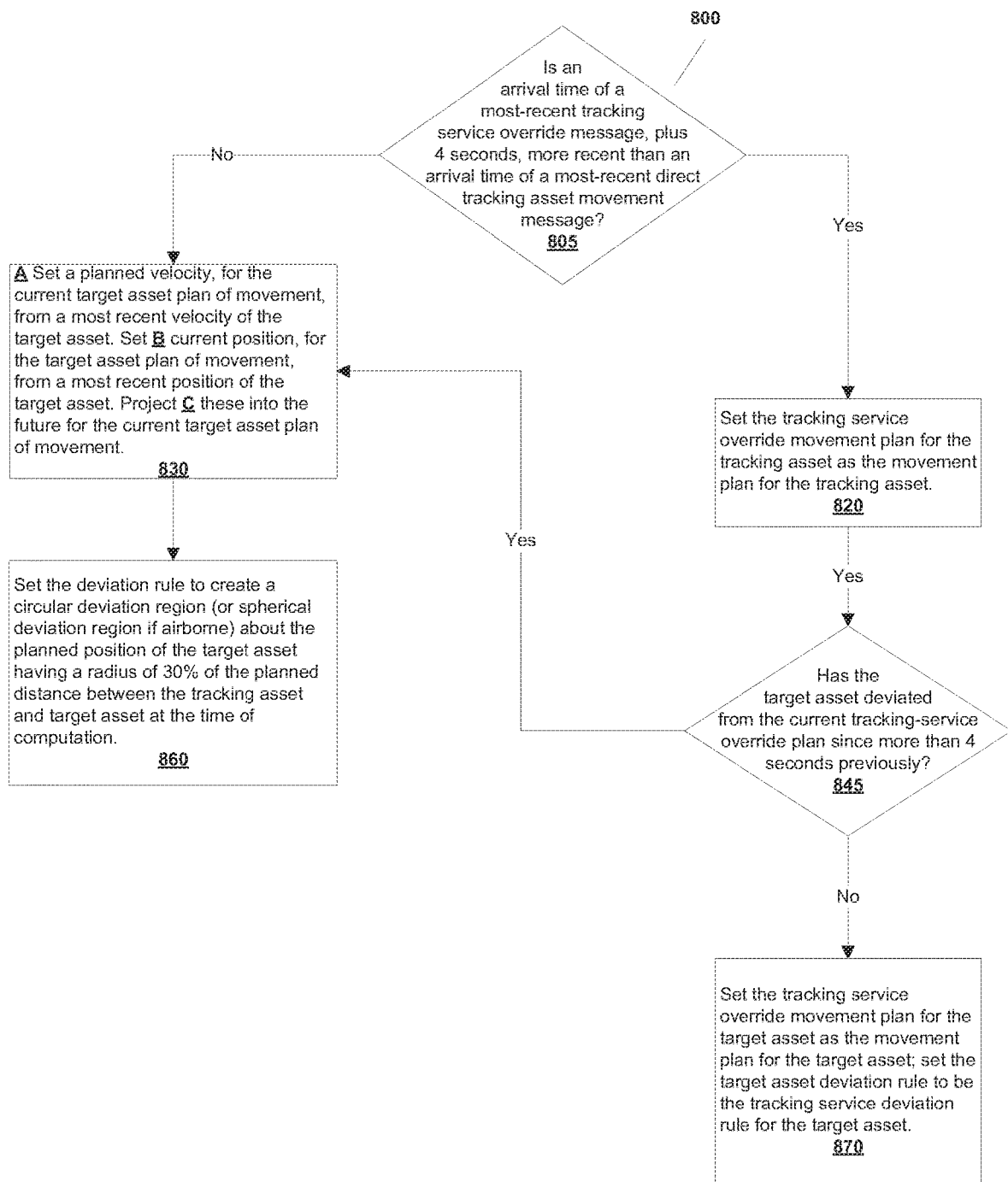
FIG. 8 illustrates computation, by a target asset or device, of a current target asset plan of movement and a current target asset deviation rule.

Provided the process illustrated by FIG. 3 was initiated by a 301 or 305 message, whereby there is new target asset information 330, a current general target asset plan of movement and deviation rule is computed 332, which computation is presented in detail as the process 800 of FIG. 8. The computation utilizes the currently known plans of movement for the target asset, which may have come from the target asset or from a tracking service. Also, any plan of movement for the target asset that has come from a tracking service is used as-is, provided it has been received sufficiently recently (as seen in FIG. 8). While both a tracking device and target device may have a plan of movement from a tracking service, only the tracking asset is expected to actively follow a plan of movement. For a target asset in the example embodiment, a plan of movement is not used as direction but only a prediction that is compared with what eventually occurs.

If a maximum interval between transmissions of fresh positioning information is exceeded 333 and if the current estimated variance of position or velocity can be improved by more than 30% by incorporating a GPS fix, which in this example embodiment is determined according to the covariance matrix of the Kalman filter process being used, then the GPS is powered up and GPS positioning (in this example embodiment, or in others the most accurate positioning device available) is used to obtain the latest positioning information for the target asset 334. The GPS is again powered down and the new GPS positioning information is incorporated into estimates of position and velocity according to the Kalman filter process in use.

If a maximum interval between transmissions of fresh positioning information is not exceeded 333, then a current-time target asset allowed deviation region is computed 335B and an estimated target asset 90% uncertainty region is computed 335A. The target asset allowed deviation region computation uses current time: a planned current position of the tracking asset linearly interpolated from the plan of movement for the tracking asset last received; a planned current target asset position, interpolated from a plan of movement; and a target-asset deviation rule. This computation is performed using information that is also available to the tracking asset and, if applicable, a tracking service. Deviation rules that have been generated by the target asset itself, in this example embodiment whereby there is an external tracking service, create a deviation region that is circular about the planned position of the target asset and having size dependent on the planned distance, at the current time, between the target asset and the tracking asset. However, deviation regions based on deviation rules from a tracking service are in some embodiments beneficially more complex. For example, a deviation rule from a tracking service in some circumstances will be that as long as a target asset is within 75 feet of any future planned position according to the plan of movement, which perhaps is any position along a roadway extent of many miles, then there is no transmission of new positioning information from the target asset until a maximum interval between such transmissions of fresh positioning information is exceeded 333. In some such embodiments, the removal of a predicted path (such as a roadway) from the computation of allowed deviation region occurs when the target device observes, based on electronic positioning devices 150, that it has progressed past a position in the predicted path. This beneficially causes a part of the process of FIG. 3 to begin if a target asset reverses direction and heads back the other way, which starts with a computation of a local plan of movement 343 and then communication of that information with a tracking service 360.

It is common for automobiles piloted by a human driver, as an example target asset type, to come to complete stops, most often because of traffic. But as long as the intention of the driver is to continue forward according to a plan already received, then there is no need in the example embodiment for a tracking service to be informed of a slow or fast rate of progress. Nevertheless, it is beneficial to know when a driver no longer intends to, or is no longer able to, continue according to an existing plan, and reversing direction is just as effective an indicator of that circumstance as is driving entirely off of a planned roadway path.

The 90% uncertainty region is computed 335A as previously described. The estimated accumulated error grows with each successive data point that is projected using inertial positioning devices; but when it has grown large and a GPS positioning data point is taken then it collapses. As noted previously, commercially available GPS devices differ in accuracy by multiple orders of magnitude, so the initial estimated error after a GPS data point is taken can likewise differ by multiple orders of magnitude, depending in part on the construction of the device.

In the example embodiment, planned positions of a tracking asset and target asset are linearly interpolated using a time base between predicted locations. Those skilled in the art will appreciate that other interpolation techniques can be used, and that less densely spaced points in the predicted future can be computed and transmitted with more complex interpolation. However, because the future planning in some embodiments is computed by a tracking service, it can be efficient to provide more densely spaced points and use linear interpolation as such paths can be arbitrary. Tracking services may have detailed information about possible routes for an asset and can predict arbitrary paths of movement. Moreover, when a tracking service is not used, a predicted future movement will in some embodiments simply be a straight line since mobile devices may not have such detailed information. Nevertheless, more complex interpolation techniques may be used without departing from the teachings of this specification.

The current uncertainty region of the target asset is determined 338 to either be within the allowed deviation region computed as described in the previous paragraphs, or some part of it is outside it. If it is within it, then this activity loops back and waits for one of the 301,305,306, or 310 events that will again begin this activity.

If the 90% current uncertainty region is in part outside the allowed deviation region and if the current estimated variance of position or velocity (from the Kalman filter covariance matrix for each dimension) can be improved more than 30% by a GPS fix for either horizontal position, which in this example embodiment is determined by computing another step in advance according to the Kalman filter process used, then the GPS component is powered up and GPS positioning (in this example embodiment, or in others the most accurate positioning device available) is used to obtain the latest positioning information for the target asset 339. The GPS is turned off again to save power. In this example embodiment, the obtained GPS positioning information is used to make more accurate any recent inertial positioning information. With this probabilistically more accurate positioning information, the estimated error is updated, and the 90% uncertainty region is updated.

Using this potentially more accurate and smaller 90% current uncertainty region, check again and if the 90% current uncertainty region is contained in the allowed deviation region 340, then this process loops back to the beginning and waits for any of the 301,305,306, or 310 initiating events.

If the 90% current uncertainty region is not contained in the allowed deviation region 340, then a current local target asset plan of movement is computed 343 (which computation is presented in detail as the process 800 of FIG. 8), but modified such that the first branch 805 always takes the "No" path. It is called local because it does not depend on information or computation from a tracking service and is instead computed entirely by a target device based on information available to it locally. In this example embodiment, that local information does not include a mapping database. In this example embodiment, at any time connectivity can be lost with a tracking service and tracking will nevertheless continue if there is a communication mechanism that continues to provide message exchange between the target and tracking devices.

Next a target asset movement message is constructed 345 that comprises: 1) a hash based identifier and a time stamp for the last received movement plan for the tracking asset, which was comprised by the last received tracking-service override tracking message; 2) a hash based identifier and a time stamp for the last received movement plan for the target asset, which was comprised by the last received tracking-service override tracking message; 3) a recent target asset history of movement (since last known receipt by both the tracking service and the tracking asset), taken from the target asset history of movement; 4) the current local target asset plan of movement; and 5) a target-asset deviation rule. The deviation rule is that the allowed deviation region is circular about the current planned target asset location and has a diameter of 30% of the planned distance between the tracking asset and target asset at the current time. However, the allowed region has a minimum diameter of four times an estimated standard deviation of a position obtained from the positioning devices from a true position. Note that the accuracy of positioning devices, such as GPS devices, can be no better than 50 feet (or even worse) or it can be within 2 inches (or even less), depending on which GPS component devices are used. Because of this wide range of accuracy, it is also useful to have a minimum diameter that is based on the effective size of the target asset. If it is a vehicle, then for this example embodiment two lengths of the vehicle is also a minimum diameter for the allowed deviation region. If the target asset is a person, then for this example embodiment 12 feet is also a minimum diameter for the allowed deviation region.

If the tracking device is directly reachable with a low-power radio 350, which for this example embodiment means via Bluetooth or WI-FI, then the previously constructed target asset movement message 345 is sent to the tracking device using the lowest power of the low power radios available 355. In this example embodiment, the Bluetooth radio would be chosen over WI-FI. Note however that an appropriate comparison of power used is not necessarily per time interval but per message. A higher power consumptive technology when compared over equal time periods could be less consumptive for a sufficiently long message because it could get the message to its destination much faster. Devices that can turn on and off their transmission power consumption fast enough could be more efficient even though they consume more power when transmitting over the same time interval.

Note that if the 355 transmitted target asset movement message is received by the tracking asset 201, then if necessary 208A the tracking asset will provide that message 208B to the tracking service; thereby the target asset beneficially saves battery life by bypassing transmittal 360 of the target asset movement message directly to the tracking service, which often will require use of a high-power (e.g. cellular) radio.

If the tracking device is not directly reachable with a low-power radio 350, which for this example embodiment means via Bluetooth or WI-FI, then the target device then sends the target asset movement message to the tracking service 360. In this way the tracking service receives the latest movement information for the target asset, with which it may construct better predictions or directions for the target asset.

If neither the tracking device nor the tracking service receives the target asset movement message 365, then an attempt to send the target asset movement message to the tracking device is made using any possible connectivity 375A. In some embodiments, this would be an attempt using the lowest power radio to an in-range electronic communication node that provides connectivity to the Internet. Any of Bluetooth, WI-FI, or cellular networks could be used, depending on current connectivity.

The tracking device receives the target asset movement message and compares the hash based identifiers for the content of the last received tracking-service override tracking message, and verifies that it has already received them. If not, then it requests that content in a reply. If the target device receives such a request, then it sends the content of the last received tracking-service override tracking message to the tracking device across the established connectivity from which it received the message 375B The current target asset plan of movement, used at the target device, is updated to the local target asset plan of movement 370. Then the process of FIG. 3 loops back to waiting for one of the events that starts the process of FIG. 3. In particular, it loops back to waiting for the periodic timer to run down 310 or one of the other 301,305, or 306 events that will again begin this activity.

Figure 4:
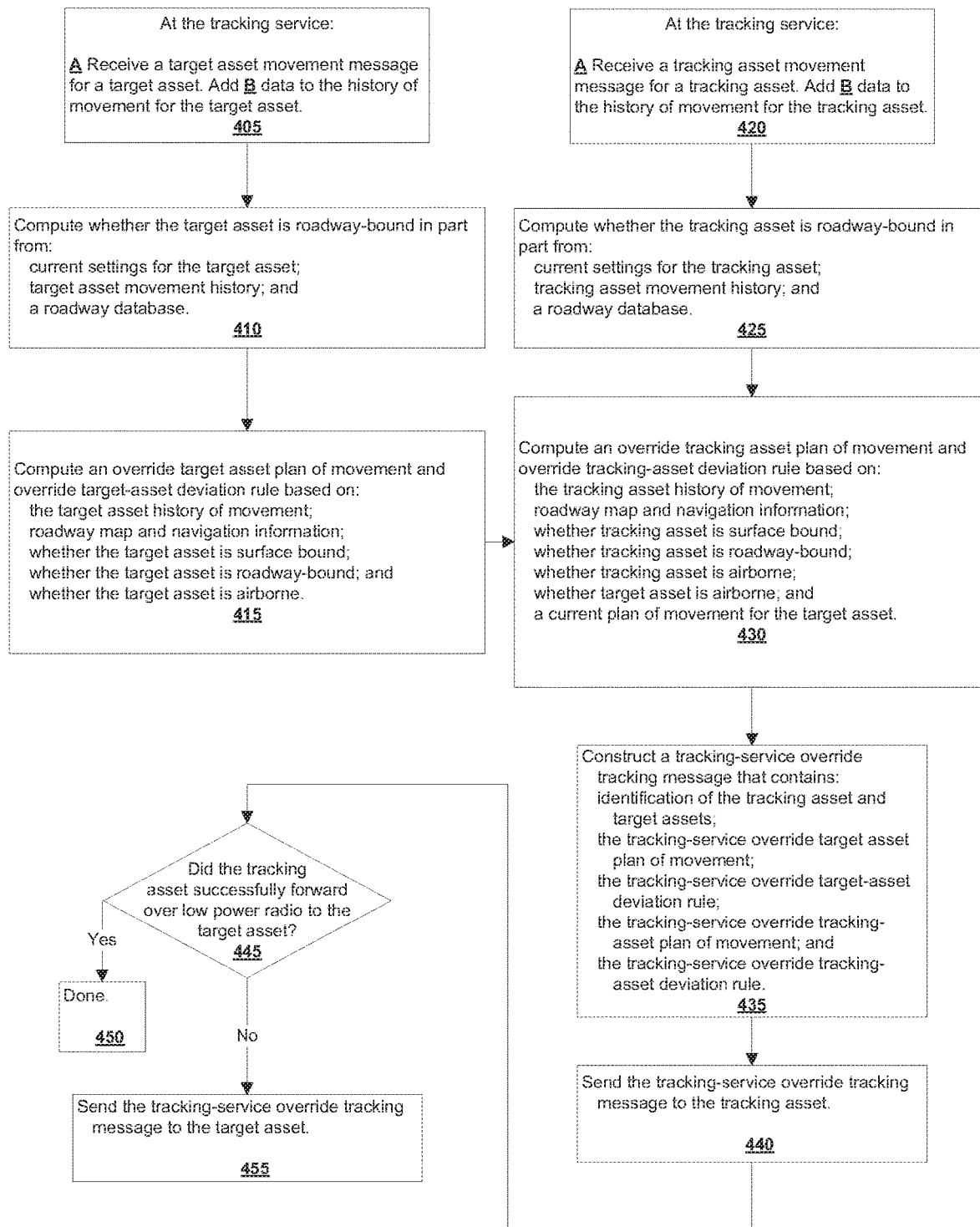
FIG. 4 illustrates a tracking service receiving movement plans, movement histories, and device status, and then creating and transmitting movement plans to tracking and target assets.

FIG. 4 illustrates a tracking service receiving locally generated (i.e., generated by target and tracking devices) movement plans, movement histories, and device status, and then creating and transmitting service generated movement plans to tracking and target assets. Such service generated movement plans have, in these example embodiments, access to mapping databases, such as databases and software that makes it possible to navigate over roadways. In these example embodiments, a tracking service provides tracking and navigational support for both the target and tracking assets.

Figure 5:
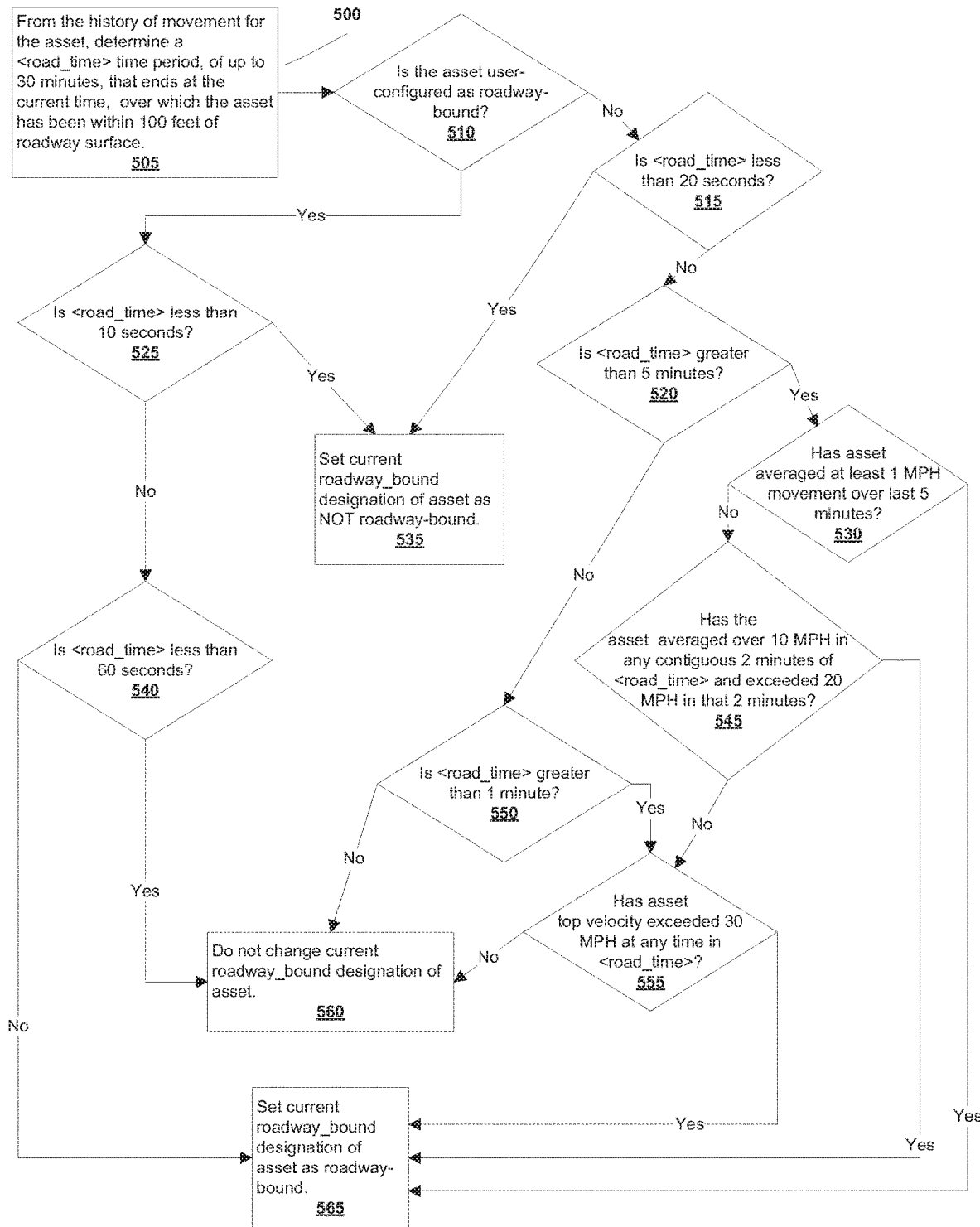
FIG. 5 illustrates a tracking service making a determination of whether to treat a mobile target or tracking asset as roadway-bound when predicting or planning future movement of the asset.

In the example embodiment, when a tracking service receives a target asset movement message 405A, which was sent directly from the target asset 360 or indirectly through the tracking asset 208, it first stores the information in a history for the target asset 405B. Using the history of movement for the target asset a determination is made as to whether the target asset is roadway bound 410 (details of how such a determination is made are illustrated in FIG. 5).

Figure 10:
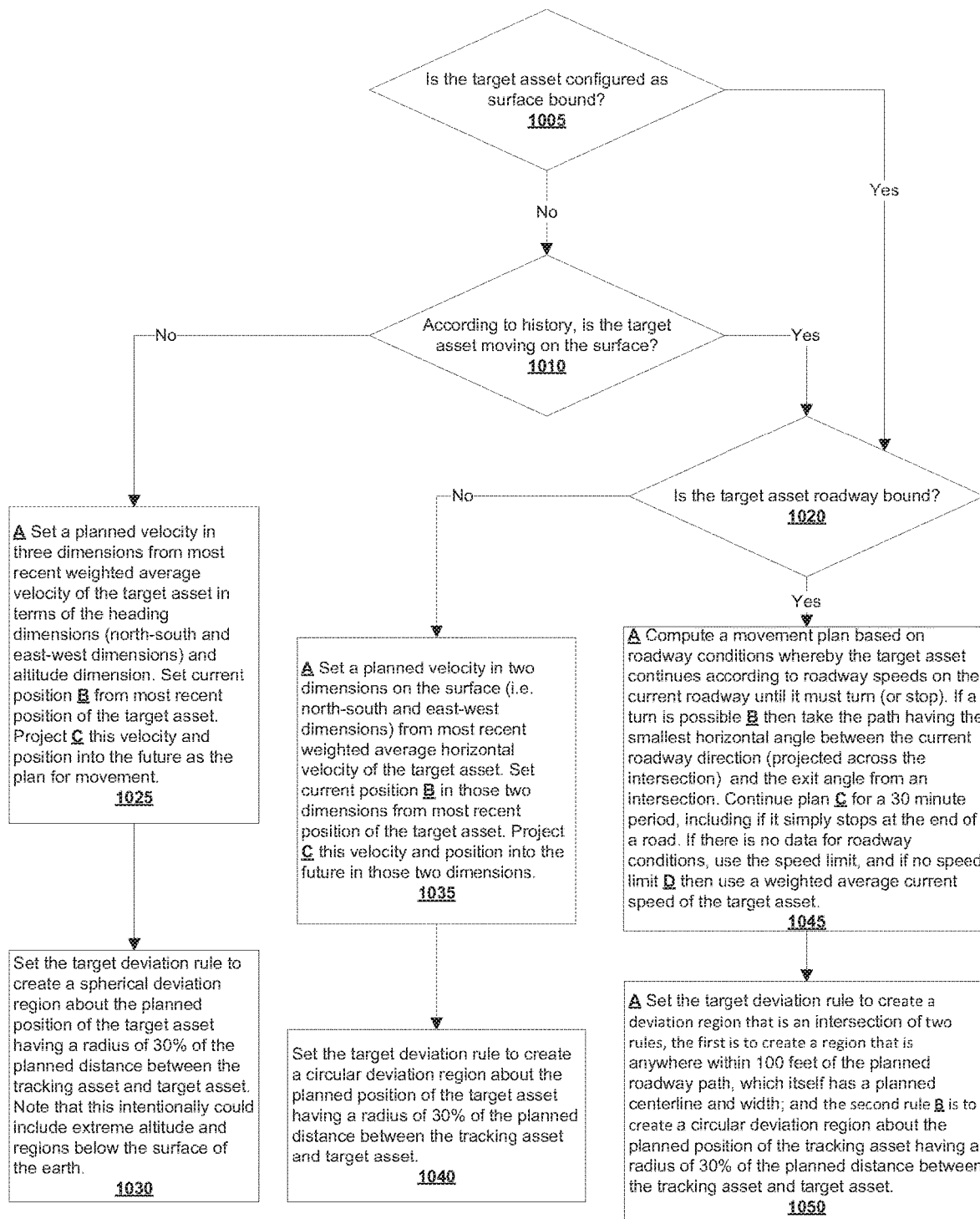
FIG. 10 illustrates computation, by a tracking service, of a tracking service provided override plan of movement and deviation rule for a target asset.

An override target asset plan of movement and override target-asset deviation rule are computed 415 based in part on: the target asset history of movement; roadway map and navigation information; whether the target asset is surface bound; whether the target asset is roadway-bound; and whether target asset is airborne (details of this computation are illustrated in FIG. 10). This target asset override target asset plan of movement is needed in order to compute the override tracking asset plan of movement 430 so that the tracking asset can intelligently collocate with the target asset based on where it will be and not only on where it is presently.

Figure 11:
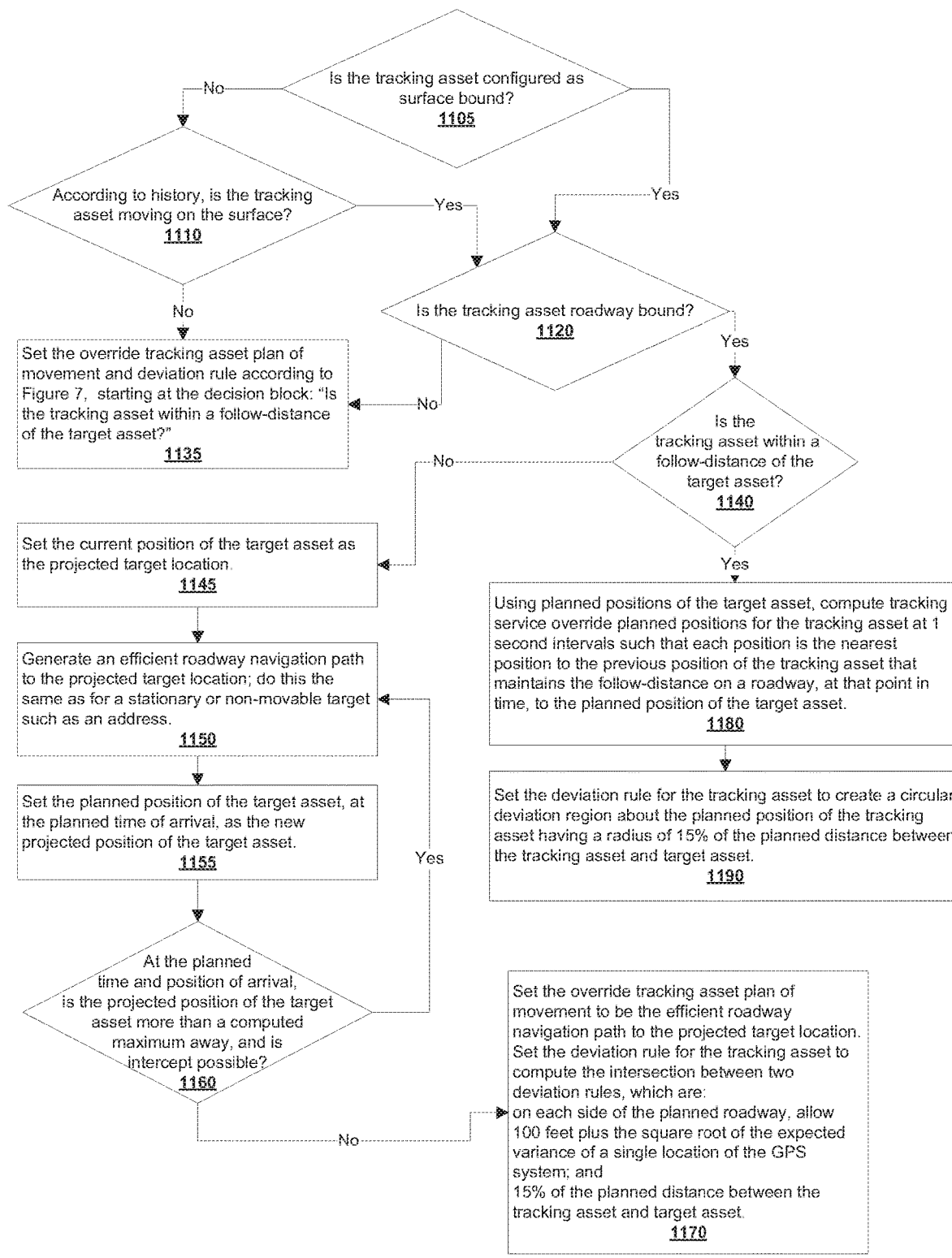
FIG. 11 illustrates computation, by a tracking service, of a tracking service provided override plan of movement and deviation rule for a tracking asset.

The override tracking asset plan of movement computation 430 depends in part on: the tracking asset history of movement; roadway map and navigation information; whether the tracking asset is surface bound; whether the tracking asset is roadway-bound; whether the tracking asset is airborne; and the current plan of movement for the target asset (details of this computation are illustrated in FIG. 11).

While the current plan of movement for the target asset may have just been computed 415, it would have been taken from memory if the activity of FIG. 4 was initiated by receiving a tracking asset movement message for a tracking asset 420A, which would have been sent by the tracking asset 260. After receiving such a message 420A, the history of tracking asset movement is stored with previous history of movement for the tracking asset 420B. Then it is determined whether the tracking asset is roadway bound 425, as illustrated in FIG. 5.

An override tracking asset plan of movement and override tracking-asset deviation rule are computed 430, in part based on: the tracking asset's history of movement; roadway map and navigation information; whether the tracking asset is surface bound; whether the tracking asset is roadway-bound; whether the tracking asset is airborne; and the current plan of movement for the target asset, as illustrated in FIG. 11.

A tracking-service override tracking message is constructed 435 and sent to the tracking asset 440. The message comprises: identification of the tracking asset and target assets; the tracking-service override target asset plan of movement; the tracking-service override target-asset deviation rule; the tracking-service override tracking-asset plan of movement; and the tracking-service override tracking-asset deviation rule.

If the tracking asset received the message 445 then it forwards it immediately to the target asset 207A, provided it is in range of low-power radio from the tracking asset. Success or failures in that forwarding is reported back to the tracking service 207C and, if it was successful, then the tracking service does not send directly to the target asset 450. If the message was not forwarded successfully to the target asset 445, then the tracking service sends the tracking service override tracking message directly to the target asset 455.

FIG. 5 illustrates a tracking service making a determination of whether to treat either a mobile target or tracking asset as roadway-bound when predicting or planning future movement of the asset. From the history of movement for the asset in question, duration (<road_time>) is computed 505 for the most recent continuous period that ends with the present time, of up to 30 minutes, over which the asset has been within 100 feet of roadway surface.

If a roadway-bound property for an asset has not been previously set to one value or another, then its initial value is roadway-bound if a user has designated it as roadway-bound, and not-roadway-bound otherwise. This establishes the value of the property in the event that the activity of FIG. 5 described below does not change the value of the property.

If the asset is configured as roadway-bound 510 and <road_time> is less than 10 seconds 525, or if the asset is not configured as roadway-bound 510 and <road_time> is less than 20 seconds 515, then a roadway-bound property for the asset is set as not-roadway-bound 535.

If the asset is configured as roadway-bound 510 and <road_time> is greater than 60 seconds 540, then a roadway-bound property for the asset is set as roadway-bound 565.

If the asset is not configured as roadway-bound 510, <road_time> is greater than five minutes 520, and; the asset has averaged 1 MPH (miles per hour) over the last 5 minutes 530; the asset averaged over 10 MPH in any contiguous 2 minutes during <road_time> and exceeded 20 MPH at any time during the contiguous 2 minutes 545; or during <road_time> the asset exceeded 30 MPH at any time 555, then a roadway-bound property for the asset is set as roadway-bound 565.

If the asset roadway-bound property has not been set either as roadway-bound or NOT roadway-bound in the foregoing, then no change is made to the current roadway-bound property 560. For example, if it is set to roadway-bound, then it remains roadway-bound, and otherwise it remains not-roadway-bound.

Figure 6:
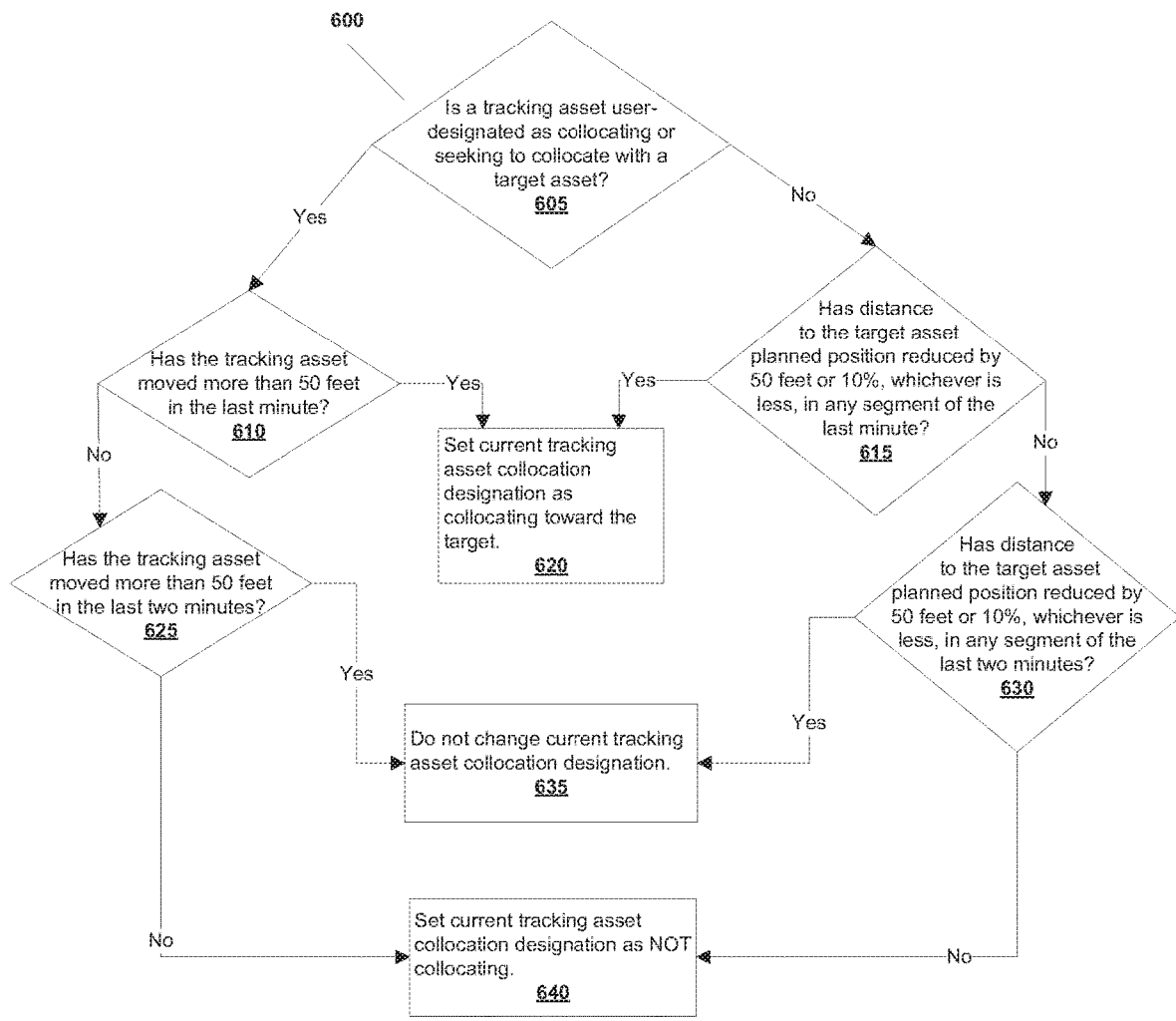
FIG. 6 illustrates determining whether a tracking asset is currently collocating toward a target asset or only tracking it.

FIG. 6 illustrates determining whether a tracking asset is currently collocating toward a target asset or only tracking it. Note that collocation activities include movements to remain collocated, such as following a target asset at a distance. As described before, in some embodiments, when a tracking asset is not collocating then the dynamic deviation regions set for both the tracking asset and target asset are doubled in size (i.e., for the example embodiments with this added feature, deviation regions described by a circle that is 30% in diameter for target assets of the planned distance between tracking and target assets is, in such an embodiment, increased to 60% of the planned distance). Similarly, a 15% in diameter for tracking assets of the planned distance between tracking and target assets is, in such an embodiment, increased to 30% of the planned distance.

If a collocating property for a tracking asset has not been previously set to one value or another, then its initial value is collocating if a user has designated it as collocating, and not-collocating otherwise. This establishes the value of the property in the event that the activity of FIG. 6 described below does not actively set the value of the property.

If a user has designated or configured a tracking asset as collocating 605, and the tracking asset has moved more than 50 feet in the last minute 610, then set the collocating property of the tracking asset as collocating 620.

If a user has not designated or configured a tracking asset as collocating 605, and distance to the target asset's planned position has reduced by 50 feet or 10%, whichever is less, in any measured segment of time during the last minute 615, then set the collocating property of the tracking asset as collocating 620.

If a user has designated or configured a tracking asset as collocating 605, and the tracking asset has moved less than 50 feet in the last two minutes 625, then set the collocating property of the tracking asset as not collocating 640.

If a user has not designated or configured a tracking asset as collocating 605, and distance to the target asset's planned position has not reduced by 50 feet or 10%, whichever is less, in any measured segment of time during the last two minutes 630, then set the collocating property of the tracking asset as not collocating 620.

If the collocating property of the tracking asset is not set either as collocating or not collocating in the above steps, then no change is made to the property 635.

FIG. 7 illustrates computation, by a tracking asset itself, of a current tracking asset plan of movement and a current tracking asset deviation rule. Note that some computations performed by a tracking asset are duplicated by a tracking service if a tracking service is available; however, to ensure operation (with reduced functionality) when a tracking service cannot be reached, some computations are performed by the tracking asset (i.e., by or at the location of the tracking device). The first thing is to check if there is a tracking service override plan of movement for the tracking asset that is timely. Timely, in this circumstance, means that the tracking service has sent the tracking device an override plan of movement, which applies to the latest information about the target asset, within 4 seconds of the time stamp on the latest information from the target asset. If not, then previously received override movement plans from the tracking service are ignored and a local movement plan is created and used until a movement plan is received from the tracking service.

If an arrival time of a most-recent tracking service override message, plus 4 seconds, is more recent than an arrival time of a most-recent direct target asset movement message 705, and if the tracking asset has not deviated from the current tracking-service override plan continuously 745 (i.e., according to each assessment of positioning information made for the tracking asset in the last 4 seconds), then the tracking service override movement plan for the tracking asset is set as the current movement plan for the tracking asset and the deviation rule for the tracking asset is set to be the override tracking service deviation rule for the tracking asset 770.

If content of an override tracking service message is not set in the previous paragraph as the movement plan for the tracking asset, then check if the tracking asset is within a previously determined follow distance of the target asset, based on the latest positioning information for both target and tracking assets 725. If so, then: using planned positions of the target asset, compute a movement plan consisting of planned positions for the tracking asset at 1 second intervals such that each position is the nearest position to the previous position of the tracking asset that maintains % of the follow-distance, at that point in time, to the planned position of the target asset 740; and then set the deviation rule to create a circular deviation region (or spherical deviation region if airborne) about the planned position of the tracking asset having a radius of 15% of the planned distance between the tracking asset and target asset 760.

If the tracking asset is not within a previously determined follow-distance of the target asset 725, then the most recent movement of the tracking asset is simply projected out, because in the example embodiments the tracking asset itself does not possess a topological database or a road map.

However, in some embodiments and circumstances, a tracking asset will have downloaded local mapping information from a tracking service and will perform, on a localized basis (to the extent that its mapping data extends from its current position) the same or similar computation performed by the tracking service that is illustrated in FIG. 11. Note also that a part of FIG. 7 is called out in FIG. 11 for its computation of movement plans that is used when topological and road maps are not applicable.

A planned speed is set from the most recent velocity information of the tracking asset 730A. In the example embodiments, this is an exponentially weighted average, using for efficiency an IIR (infinite impulse response) filter that weights the most recent velocity data the most and drops off to ¼ for one-second old data. Using planned positions of the target asset 730B, compute an intercept planned position of the target asset using the calculated speed such that the intercept planned position is the first planned position of the target asset such that the tracking asset, traveling in a straight line at the planned speed, can be at that intercept planned position on or before the time that the target asset is planned to be at that position 730C.

Note that the speed of the tracking asset may be insufficient to intercept the target asset based on target asset movement projections. Moreover, the distance between the two assets may be so great that it may be inadvisable to plan sufficiently far ahead for an intercept. If the previous computation 735 successfully created an intercept and if the intercept distance is less than twice the current distance to the target asset, then: set the current movement plan of the tracking asset to be a shortest path on the surface to the intercept planned position at the planned speed, with predicted future positions at 1 second intervals or one tenth the remaining predicted time to intercept, whichever is less 755A; plan for a time period that is 3-times the maximum (between the tracking and target assets) interval of the periodic-timer for default reporting of new positioning information; if planned collocation occurs prior to the end of the planned interval, then plan to follow the target asset from that point forward at a follow-distance 755B; and set the deviation rule to create a circular deviation region (or spherical deviation region if airborne) about the planned position of the tracking asset having a radius of 15% of the planned distance between the tracking asset and target asset 760.

If the previous computation 735 either did not create an intercept point, or if the intercept distance is more than twice the current distance to the target asset, then: compute an intercept planned position of the target asset as the first planned position of the target asset that is twice the current distance of the target asset from the tracking asset 750. If no such position exists, then use the current position of the target asset as the intercept planned position. Then continue as described above for setting a current movement plan 755A-B and deviation rule 760.

FIG. 8 illustrates computation, by a target asset or device itself, of a current target asset plan of movement and a current target asset deviation rule.

If an arrival time of a most-recent tracking service override message, plus 4 seconds, is more recent than an arrival time of a most-recent direct tracking asset movement message 805, and if the target asset has not deviated from the current tracking-service override plan continuously 845 (i.e., according to each assessment of positioning information made for the target asset in the last 4 seconds), then the tracking service override movement plan for the target asset is set as the current movement plan for the tracking asset and the deviation rule for the tracking asset is set to be the override tracking service deviation rule for the tracking asset 870.

A planned velocity is set from the most recent velocity information of the tracking asset 830A. In the example embodiments, this is an exponentially weighted average, using for efficiency an IIR (infinite impulse response) filter that weights the most recent velocity data the most and drops off to ¼ for one-second old data. Using planned positions of the target asset 830B, project this velocity (both speed and direction) into the future as the current plan of movement for the target asset 830C. Set the deviation rule to create a circular deviation region (or spherical deviation region if airborne) about the planned position of the target asset having a radius of 30% of the planned distance between the tracking asset and target asset 860.

Figure 9:
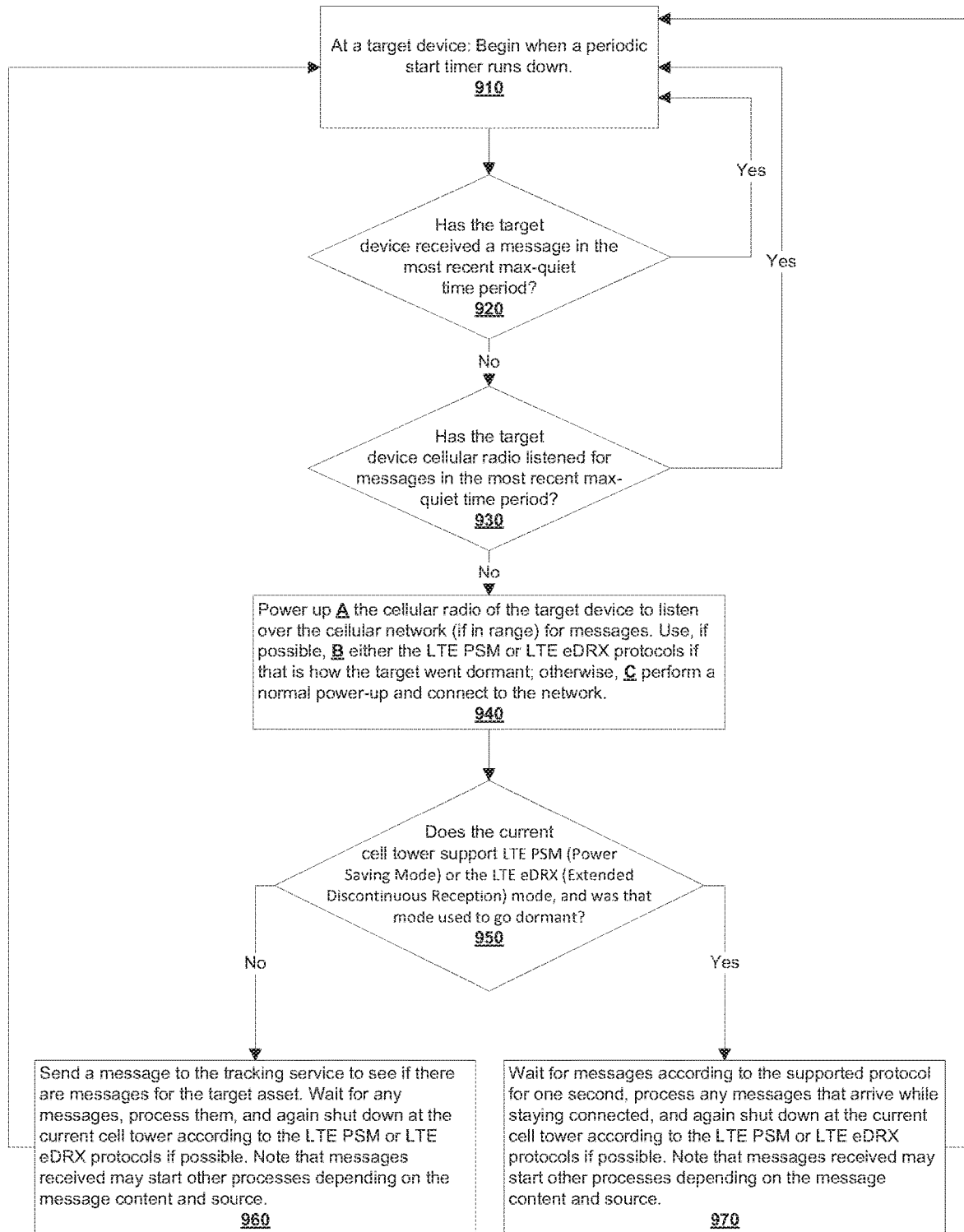
FIG. 9 illustrates a target or tracking asset periodically powering up a message receiving radio, and in particular a cellular radio, to conserve power.

FIG. 9 illustrates a target or tracking asset periodically powering up a message receiving cellular radio to conserve power. There are power-saving modes of operation, as mentioned previously, for cellular reception that allow a cellular user equipment device to power off for periods of time to save battery power.

In the example embodiments, the idle power consumption of the radio is limited by use of the LTE PSM (Power Saving Mode) or the LTE eDRX (Extended Discontinuous Reception) mode of the LTE-M1 standard published by The 3rd Generation Partnership Project (3GPP). If neither of these modes are supported by the currently used cell tower, then in the example embodiment the target device turns off its cellular radio as a listening device for periods of time. Simply turning off the target device cellular radio has a disadvantage of necessarily re-joining the network whenever listening is desired. However, neither the LTE PSM nor LTE eDRX are implemented everywhere (and in many places neither are implemented), so a default behavior is to turn off the radio after informing a tracking service of a duration over which it will not listen, as seen in FIG. 9.

At a target device, begin when a periodic start timer runs down 910. By default in the example embodiments, this occurs once every second. If the target device has received a message (either from the tracking service or a tracking asset) in the most recent max-quiet length time period 920 (max-quiet is one minute in duration, by default in the example embodiments), then return to the start timer wait state 910. Note that receiving a message is possible, for example, due to events that cause the target asset to transmit on its own.

If the target device cellular radio has listened for messages in the most recent max-quiet time period 920, then return to the start timer wait state 910.

Power up the cellular radio of the target device to listen over the cellular network (if in range) for messages 940A. Use, if possible, either the LTE PSM or LTE eDRX protocols if that is how the target went dormant 940B. Note that the cellular network or cell tower where the target device went dormant may not be currently available and state may not be maintained reliably between listening periods for other reasons for either the LTE PSM or LTE eDRX protocols. Therefore, as a default behavior, perform a normal power-up and connect to the network 940C.

If the current cell tower does not support LTE PSM or the LTE eDRX mode, or neither of those modes was used to go dormant 950, then send a message to the tracking service asking if there are any messages 960. Effectively, this is a request for the current state and the target sends identifiers for the latest tracking server override message it received, and if the tracking service has fresher information then it sends it to the target device. Such a message is processed as illustrated in FIG. 3. Then return to the start timer wait state 910.

If the current cell tower does support LTE PSM or the LTE eDRX mode, and one of those modes was used to go dormant 950, then wake up according to the power-saving mode protocol and listen for any messages and process any such messages received 970 (e.g., as illustrated in FIG. 3), and then return to the start timer wait state 910.

FIG. 10 illustrates computation, by a tracking service, of a tracking service override plan of movement and deviation rule for a target asset.

If the target asset is configured by a user as surface-bound 1005, which would logically be the case for any asset that cannot go airborne and transmit while airborne, or according to movement history the target asset it is moving on the surface 1010, then if the target asset is roadway-bound 1020 (details of which determination are illustrated in FIG. 5), compute a movement plan based on roadway conditions whereby the target asset continues according to roadway speeds on the current roadway until it must turn (or stop) 1045A; if a turn is possible then take the path having the smallest horizontal angle between the current roadway direction (projected across the intersection) and the exit angle from an intersection 1045B. Continue this plan for a 30 minute period, including if it simply stops at the end of a road 1045C. If there is no data for roadway conditions, use the speed limit, and if no speed limit then use an IIR exponential filter to build a weighted average for recent speed, that drops off to per second weighted average for the current speed of the target asset 1045D.

Set the target deviation rule to create a deviation region that is an intersection of two rules 1050, the first is to create a region that is anywhere within 100 feet of the planned roadway path 1050A, which itself has a planned centerline and width; and the second rule is to create a circular deviation region about the planned position of the tracking asset having a radius of 30% of the planned distance between the tracking asset and target asset 1050B.

If the target asset is configured by a user as surface-bound 1005, which would logically be the case for any asset that cannot go airborne and transmit while airborne, or according to movement history the target asset it is moving on the surface 1010, then if the target asset is not roadway-bound 1020 (details of which determination are illustrated in FIG. 5), create a movement plan from a projected velocity in two dimensions on the surface (such as north-south and east-west dimensions) from a most recent weighted average of horizontal velocity of the target asset 1035A. The weighted average is performed using an IIR filter with an exponential drop-off to over one second. Set current position in those two dimensions from most recent position of the target asset 1035B. Project this velocity and position into the future in those two dimensions for the plan of movement 1035C. Set the target deviation rule to create a circular deviation region about the planned position of the target asset having a radius of 30% of the planned distance between the tracking asset and target asset 1040.

If the target asset is configured by a user as not surface-bound 1005, or according to movement history the target asset is airborne 1010, then project a planned velocity in three dimensions from a most recent exponentially weighted average velocity of the target asset in terms of the heading dimensions 1025A (north-south and east-west dimensions) and altitude dimension. The exponential drop-off is to ¼ in one second in the example embodiments. Set current position from most recent position of the target asset 1025B. Project this velocity and position into the future as the plan for movement 1025C. Set the target deviation rule to create a spherical deviation region about the planned position of the target asset having a radius of 30% of the planned distance between the tracking asset and target asset 1030. Note that this intentionally could include extreme altitude and regions below the surface of the earth.

FIG. 11 illustrates computation, by a tracking service, of a tracking service provided override plan of movement and deviation rule for a tracking asset.

If the target asset is configured by a user as not surface-bound 1105, according to movement history the target asset is airborne 1110, or the tracking asset is not roadway bound 1120, then set the override tracking asset plan of movement and deviation rule for the tracking asset according to FIG. 7, starting at the decision block; "Is the tracking asset within a follow-distance of the target asset?" 725.

If the tracking asset is within a follow-distance of the target asset 1140, then using planned positions of the target asset, compute a tracking service override planned positions for the tracking asset at 1 second intervals such that each position is the nearest position to the previous position of the tracking asset that maintains ¾ of the follow-distance on a roadway, at that point in time, to the planned position of the target asset 1180. Set the deviation rule for the tracking asset to create a circular deviation region about the planned position of the tracking asset having a radius of 15% of the planned distance between the tracking asset and target asset 1190.

If the tracking asset is not within a follow-distance of the target asset 1140, then set the current position of the target asset as the projected target location and enter an iterative loop that will re-compute a navigational path to the target asset until there is a projected intercept. Note that the loop is not repeated if the tracking asset is too slow to intercept the target asset, and instead the tracking asset proceeds to the initial position of the target asset.

In the iterative loop, set the current position of the target asset as the projected target location 1145. Generate an efficient roadway navigation path to the projected target location 1150 (do this the same as is done conventionally for a stationary or non-movable target location such as an address). Set the planned position of the target asset, at the planned time of arrival by the tracking asset at the old projected location, as the new projected position of the target asset 1155. The last step of the iterative loop is to check if the tracking asset is "gaining" on the target asset sufficiently and if the distance at the planned time of arrival of the tracking asset is within a predetermined maximum distance of the target asset planned position at that time, which in the example embodiments is 50 feet (for vehicles) or a planned follow distance. Sufficiently gaining on the target asset requires that the tracking asset is at least faster than the target asset; if not it cannot collocate from a distance. If the tracking asset is gaining on the target, but is not yet within the maximum distance, then the loop iterates 116).

After the loop 1160 ends, the override tracking asset plan of movement is set 1170 to be the efficient roadway navigation path computed in the last loop, to the projected target location. The deviation rule for the tracking asset is set to compute the intersection between two deviation rules, which are: on each side of the planned roadway, allow 100 feet plus the square root of the expected variance of a single location of the GPS system; and create a circle about the planned location of the target asset that is 15% of the planned distance at that time between the tracking asset and target asset.

The following definitions are provided for terminology used herein:

Asset: an asset is an identifiable thing or set of things. Assets include, without limitation, physical devices, computation devices, communication devices, objects, animals, plants, persons. An asset can be an aggregation of other assets. Assets include things less physically identifiable, such as things implemented by software; for example, an Internet service is an asset that can have a physical extent spread across multiple distant locations; such a service can run on a set of server hardware that is constantly changing. Observe that such an asset can be an aggregation having multiple physical locations simultaneously and observe that those locations are changeable from one to another without the service having any physical location in between.

Mobile asset: a mobile asset is an asset having a physical extent or physical manifestation and thereby a physical location in a frame of reference whereby: the physical extent of the asset can move from a starting location to an ending location in the frame of reference; and during the move the asset has a physical location between the starting location and the ending location. Mobile assets include, without limitation and in common physical location frames of reference (e.g. navigational frames of reference), movable physical devices, movable physical objects, animals, movable plants, and persons. Some assets are more easily moved than others, depending on the frame of reference, so an asset can be mobile in one context and not mobile or less mobile in another context. For an extreme example, the earth's rotating surface is a mobile asset in some astronomical contexts, a fixed rotating asset in others, and not mobile in others; indeed, earth-bound navigational frames of reference (an approximations of it) are based on a non-moving earth surface models which are the basis of the most often used default frames of reference; thus, a part of the earth such as a mountain is relatively immobile in some contexts while mobile, with the earth to which it is attached, physically associated, or part of, in others. Mobile assets can be physically associated with other mobile assets. A mobile asset is associated and physically associated with itself. A mobile asset is attached and physically attached to itself. The statement that an asset is mobile means that the asset is a mobile asset.

Criterion of collocation: a criterion of collocation between a first and second asset is a binary (i.e. true or false) relationship between the two assets. One criterion of collocation is that the first asset can see the second asset. Another criterion of collocation is that the first asset hears or can hear the second asset via air-borne sound. Another criterion of collocation is that the first asset is physically in contact with the second asset. Another criterion of collocation is that the first asset can receive direct radio communication from the second asset. Another criterion of collocation is that, according to GPS system location devices associated with the first and second assets, the two assets are within some predetermined distance of each other. Another criterion of collocation is that the second asset is in an automobile being driven by the first asset. Another criterion of collocation is that a collar on the second asset is attached to a leash held by the first asset. Another criterion of collocation is that the first asset is within 50 feet of the second asset.

Collocate: a pair of assets collocate with each other if over time a criterion of collocation is satisfied or maintained by movement of one or both of the assets. Other forms of the word 'collocate' have the expected meanings; for example, collocating a pair of assets is the act of placing them such that a criterion of collocation is satisfied and that act collocates that pair of assets: once done that pair is collocated and has been collocated. Gerundial phrases have the expected meanings. Nouns formed from the verb, such as collocation, also have the expected meanings.

Collocate toward: collocation is often asymmetrical: a first asset can actively collocate toward a second asset that can be oblivious to the activity of the first asset or even of the existence of the first asset. A first asset collocates toward a second asset if the first asset moves, within a frame of reference that is by default a navigational frame in which the earth's surface is modeled as stationary, and by such movement the distance between the first asset and the second asset is diminished from what it would have been if the first asset had remained fixed in the frame of reference. For example, if a first asset moves, relative to points in a navigational frame and toward another asset's position relative to the navigational frame, then the first asset is collocating toward the second asset. For example, a first asset collocates toward a second asset simply by following the second asset. A pair of assets mutually collocates if each collocates toward the other, relative to a frame of reference. As with collocate, different forms of the verb and gerundial phrases have the expected meaning. In such a phrase the words "collocating" and "toward" need not be adjacent. For example, collocating a first asset toward a second asset represents an activity whereby the first asset collocates toward the second asset.

Electronic communication node: an electronic communication node is a physical device or a physically associated set of physical devices (e.g. an aggregated physical device) that can transmit information to, receive information from, or otherwise exchange information with other electronic communication nodes. A physical association or aggregation of two or more electronic communication nodes is an electronic communication node, provided the aggregate or association can communicate externally. Such an association can also be an electronic communication network (defined below) even if it is not, as a whole, an electronic communication node. In addition to comprising hardware for transmitting, receiving, or otherwise exchanging of information, an electronic communication node comprises one or more hardware based processors, one or more hardware based memories, and one or more sequences of computer executable instructions stored in one or more of the one or more hardware based memories that can be executed by one or more of the hardware based processors. The ability to communicate with other electronic communication nodes may be transitory; e.g. the communicative association, which perhaps is accompanied by nearby physical location, of a processor and another processor with which it associates and communicates need not be continuous over time. Many aggregate devices, e.g. a smart phone, comprise other devices that have their own processor, memory, and computer executable instructions; thus a smart phone is an electronic communication node that comprises other electronic communication nodes. An electronic communication node may transmit or receive information carried by electromagnetic waves, which can take place e.g. through air, through solid objects which electromagnetic waves of various frequencies may penetrate, or a vacuum as is encountered in space; electromagnetic waves can be of a variety of frequencies such as microwaves, radio waves, infrared light, and visible light. Electromagnetic waves may be transmitted through a physical medium connecting a transmitter to a receiver, such as pipe-like wave guides or fiber optic cables. Electronic voltage or current based communication may be guided from a source electronic communication node to a destination electronic communication node by an electrical conductive medium such as copper wires. An electronic communication node may be fixed in location or mobile, depending on the communication technologies it uses and whether it can operate on mobile power such as a battery or solar power. An electronic communication node may communicate using a single communication technology or a multiplicity of communication technologies; for example, a mobile electronic communication node can usefully communicate using all three of Bluetooth, WI-FI, and LTE (cellular) communication technologies, which have different ranges, frequencies, and transmit at different power levels. An electronic communication node may comprise various kinds of hardware (in addition to transmitting hardware, receiving hardware, processors, and memory), including but not limited to screens, buttons, sensing devices, microphones, and speakers. Examples of electronic communication nodes include: smart phones, computers (with communication abilities), Internet of Things (IoT) devices, cellular stations, network routers, network switches, and communications equipped vehicles. Note that a device that comprises an electronic communication node is itself an electronic communication node. An electronic communication node can be physically associated with an asset and at the same time it can be an asset; moreover, any physical device is physically associated with itself. Some assets, which include humans and pets, are not devices and not electronic communication nodes. Also, while devices that have no communication capabilities are not electronic communication nodes, such a device may be comprised by an aggregate device that, by also aggregating communication capabilities, is an electronic communication node.

Electronic communication network: an electronic communication network comprises two or more electronic communication nodes, at least two of which can exchange information, i.e. they can transmit information to and receive information from each other. An electronic communication network may support the transmission of information from a transmitter to a receiver transitively, whereby there may be many intermediate nodes that receive the information and forward it on to other intermediate nodes and eventually to an intended ultimate destination node. If there are no intermediate nodes, then the communication is direct. In many electronic communication networks, such as the Internet, where there are billions of electronic communication nodes that can communicate with each other, a typical node may communicate with thousands of other nodes transitively over a time period (e.g. an hour) but only with a handful and often only one other node directly over that same time period. For example, a computer with an Ethernet cable to a router may only communicate directly with that singular router node in order to communicate transitively with thousands or millions of other nodes.

Distributed procedure: a set of sequences of one or more computer executable instructions that can be executed by one or more processors comprised by electronic communication nodes in an electronic communication network is a distributed procedure. A distributed procedure may include but is not limited to computer executable instruction sequences that perform collecting, transforming, aggregating, disaggregating, selecting, calculating, copying, transmitting, receiving, storing, and retrieving of information. A distributed procedure is typically intended to be executed on a multiplicity of hardware based processors, may have inputs at a multiplicity of locations, which may include locations of a multiplicity of electronic communication nodes, and may have outputs or outcomes at a multiplicity of locations, which may include locations of a multiplicity of electronic communication nodes.

A distributed procedure typically establishes a possibly nondeterministic relationship between many possible sets of concrete inputs and sets of concrete outcomes, whereas a particular execution of a distributed procedure takes a set of concrete inputs and generates, by execution of the procedure, which entails execution of one or more of the one or more sequences of computer executable instructions of the procedure, a specific set of concrete outcomes.

Distributed computation: a distributed computation is an execution of a distributed procedure in an electronic communication network. A distributed computation has specific concrete inputs and specific outcomes. A distributed computation may include and typically does include the execution of sequences of computer executable instructions on more than one processor physically comprised by more than one electronic communication node in an electronic communication network. Nevertheless, a computation that occurs entirely on a single processor of an electronic communication node in an electronic communication network is also a distributed computation. A distributed computation may comprise or constitute an aggregation of a multiplicity of other distributed computations. Identifiable computational parts or sub-computations of a distributed computation are likewise distributed computations. For example, a distributed computation can be divided into sub-computations occurring on distinct processors or aggregations of processors, each of which constitutes a distributed computation.

Concrete characteristic: a datum or set of data that are generated, computed, transformed, accessed, compressed, encrypted, transmitted, read, or written by the execution of sequences of computer executable instructions in the execution of a distributed procedure, are concrete characteristics of a distributed computation. For example, both inputs and outputs of a distributed computation are concrete characteristics of the distributed computation. Functions (whether or not executed by the distributed computation) of concrete characteristics of a distributed computation are also concrete characteristics of the distributed computation. The value of an input datum to a distributed computation as well as any function of that value is a concrete characteristic of the distributed computation and is distinct from the input datum itself. This difference is analogous to the difference between a specific instance of the numeral 5, as for example the numeral previously written on this page in this sentence, and the singular numeric value represented by all instances of the numeral 5—wherever they may be written. In addition to concrete characteristics based on data and functions of identifiable data, a distributed computation has concrete characteristics that can comprise describable concrete aspects of the distributed computation. For example, events of a distributed computation, such as the execution of specific instructions or activities (e.g. transmitting a message) that comprise or are consequences of the execution of sequences of instructions are concrete characteristics of the distributed computation. Such events and activities occur at points in time; both the events and the times of such events are concrete characteristics of a distributed computation in which they occur. Note that a distributed computation may never have produced a datum that represents either an event or a time that the event occurred. Because programmatic introspection cannot be universal since providing an observer introduces the observer or observation code to also be observed, there are necessarily concrete characteristics of a distributed computation that are never represented by a specific datum or set of data of the distributed computation. The times of events in a distributed computation are often examples of such concrete characteristics.

It is in particular possible for a first distributed computation of a first distributed procedure to have, as a concrete characteristic of the first distributed computation, that it determines the time of an event in a second distributed computation of a second distributed procedure, without ever having a datum, which is accessed by an instruction of the distributed procedure, that comprises a representation of the time of the event; for example, the first execution could involve a distributed computation that performs several activities on multiple machines as fast as the processors and memory accesses allow, and then finally when complete the event of the second distributed computation is enabled by having a concrete output of the first execution. In that case a concrete characteristic of the first distributed computation is that it determines the time of the beginning of executing instructions of the second distributed computation. Such a time could be changed by arranging for changes in the sequences of computer executable instructions that are executed in the first distributed computation. Similarly, the combination of two distributed computations, each of a possibly different distributed procedure, can be an execution of a combined distributed procedure. Thus a distributed computation could have internal timing with an internal event that then starts the previous described second distributed computation aspect of the combined distributed procedure. The time of that now internal event is a concrete characteristic of a distributed computation of the combined distributed procedure.

Outcome: a concrete characteristic of an execution of a distributed procedure, i.e. of a distributed computation, is an outcome of that distributed computation. For example, both input and output data for a distributed computation are outcomes of that distributed computation.

Derives: processing, computing, copying, translating, transforming, transmitting, sensing, and receiving initial data or an initial set of data and in so doing obtaining a resulting datum, output data, or an output set of data, derives the resulting datum, output data, or output set of data from the initial data or initial set of data. A derivation is a distributed computation, which may be comprised by other distributed computations, and which derives something from something else. Thus, writing that a datum $\alpha$ is derived from a datum $\beta$ implies a context of a concrete distributed computation of a distributed procedure, in which a derivation occurs that derives $\alpha$ from $\beta$.

Receiving and transmitting data implicitly involve creating, for example, physical signals by a transmitter and physically sensing those signals by a receiver; it is typically implicit that physical phenomena and sensors for the phenomena are utilized for such activity during a distributed computation—and indeed even for the operation of memory accesses by a processor. Moreover, a distributed computation may include both sides of such a transmission and reception or just e.g. the receiving side, in which case the received data may be described as an input. Less typically implicit are circumstances where data is directly produced from physical phenomena; for example, from a sensor that measures a physical phenomenon like atmospheric pressure; if such data is directly obtained from a sensor by a distributed computation then the distributed computation can be described as deriving data from the physical phenomena that are sensed. Just as with transmitting and receiving, and depending on the usefulness of different perspectives, such sensed data for a distributed computation can be described alternately as inputs to a distributed computation.

It is required that something concrete and non-empty can actually be derived; without this requirement the thing derived could be e.g. an empty set of data regardless of the values of any input data. Thus a resulting datum or set of data is derived from a starting datum or set of data if the values of the starting datum or set of data are used in the execution of a distributed computation to arrive at one particular resulting datum or set of data from at least two distinct possible resulting data or sets of data in the context of the distributed computation; i.e. through execution of computer executable instruction sequences of a distributed procedure, which the distributed computation is an execution of, the value or values of the concrete datum or set of data are used to select, generate, or compute the resulting datum or set of data from a set of at least two possible resulting data or sets of data. Because at least two possible outcomes must be distinct, it is a logical necessity that such a distributed procedure maps at least two distinct input values of the starting datum to distinct results in the context of the distributed computation-which is to say by changing only the starting datum. Note that an empty set of data can be at most one of the at least two distinct possible results.

Note that the verb 'derived' is not, as a logical necessity, transitive, which is to say e.g. that if $\alpha$, $\beta$, and $\delta$ represent data such that a is derived from $\beta$ and $\beta$ is derived from $\delta$ in context of a distributed computation, then these facts alone do not imply that a is derived from $\delta$ as a matter of logical necessity in context of the distributed computation. To see why this is the case, consider that while a pair of values of $\beta$ will arrive at two distinct values of a in context of the distributed computation; that particular pair of values of $\beta$ might not be obtainable by changing the values of $\delta$ in context of the distributed computation.

The verb 'derived' is active, which is to say e.g. that use of the verb 'derived' in the statement "the datum $\alpha$ is derived from the datum $\beta$" signifies more than that the datum $\alpha$ is derived or could be derived from something having the same value as the datum $\beta$; it signifies that data in the datum $\alpha$ in fact, through a computation process of a distributed computation, is in some way computed by use of the data in the datum instance $\beta$. This typically occurs in a computation activity that moves, copies, combines, selects parts of, selects using a preexisting mapping, transforms, transmits, etc. the data in the datum $\beta$. A datum or set of data can span multiple devices in an electronic communication network. The activity of a derivation, in an electronic communication network, can span many computation devices that communicate with each other; and such a derivation includes the communication activity.

The verb 'derived' is reflexive, which is to say e.g. that a datum or set of data $\alpha$ is derived from itself (i.e. $\alpha$ is derived from a) in the context of a distributed computation that accesses or otherwise makes use of a.

A datum is a copy of itself just as it is a derivation of itself. Note that a copy of a copy of a is necessarily a copy of $\alpha$. However, while a datum $\alpha$ is generically a copy of itself, it can be clear from context that 'a copy of a' references a distinct datum instance; for example, if 'a copy of $\alpha$' is on a different machine than the datum instance '$\alpha$', then '$\alpha$' and 'a copy of $\alpha$' in that context necessarily refer to distinct datum instances. Similarly, if datum instances on two or more different machines are all called $\alpha$, then $\alpha$ necessarily refers to a shared value of the datum instances or to a set of datum instances having that value. Thus, in circumstances where it is unnecessary to distinguish between instances of a datum having the same value, two or more data instances having a same value or same values may be referred to by the same name.

Consequently depends: a concrete characteristic of a distributed computation consequently depends on a datum or set of data if the values of that datum or set of data are used in the execution of the distributed computation to arrive at the value for the concrete characteristic from at least two possible values for that characteristic; i.e. through execution of computer executable instruction sequences of a distributed procedure, which the distributed computation is an execution of, the value or values of the concrete datum or set of data are used, but not necessarily exclusively, to select, generate, or compute so as to arrive at a value for the concrete characteristic from a set of at least two possible concrete characteristic values. In particular, if a datum or set of data $\alpha$ is derived from a datum or set of data $\beta$, then $\alpha$ consequently depends on $\beta$; however, consequently depends is broader than derived since a concrete characteristic of a distributed computation need not be a datum, data, or data set of the distributed computation; for more on this see the definition of "concrete characteristic".

The phrase consequently depends is active and reflexive but not transitive, similarly to 'derived' as defined above. Note in particular that a concrete characteristic consequently depends on itself; if a concrete characteristic is a function of a datum or set of data, then it consequently depends on that datum or set of data. While it is meaning-wise analogous to 'derived,' a concrete characteristic of a distributed computation does not necessarily have a datum or set of data that represents it; again, for more on this see the definition of 'concrete characteristic.' For example, the time that an event in a distributed computation occurs can be a concrete characteristic of the distributed computation-without the instruction sequences of the distributed computation ever explicitly generating or accessing data that comprises a representation of that time.

Co-dependency basis: the statement that a first concrete characteristic and a second concrete characteristic of a distributed computation share a co-dependency basis means: the co-dependency basis is a datum or set of data that is accessed, computed, generated, or otherwise used in the distributed computation; and the first and the second concrete characteristics consequently depend on the co-dependency basis in the distributed computation; and there is a modified co-dependency basis that, by changing the normal execution of the distributed procedure in the distributed computation only by replacing the value or values of the co-dependency basis in the distributed computation with the value or values of the modified co-dependency basis, would result in a modified distributed computation of the distributed procedure in which use of the value or values of the modified co-dependency basis by computer executable instructions of the distributed procedure would contribute to: a different value or set of values, in place of the first concrete characteristic, for the modified distributed computation; and a different value or set of values, in place of the second concrete characteristic, for the modified distributed computation.

Correlate positively: the statement that a first concrete characteristic and a second concrete characteristic of a distributed computation correlate positively; or equivalently that the first concrete characteristic correlates positively with the second concrete characteristic of the distributed computation, means that both the first and the second concrete characteristics have numeric values and the first and the second concrete characteristics share a co-dependency basis, which is a datum or set of data such that by changing the normal execution of the distributed procedure in the distributed computation only by replacing the value or values of the co-dependency basis in the distributed computation with the value or values of the modified co-dependency basis, would result in a modified distributed computation of the distributed procedure in which actions taken by computer executable instructions on the value or values of the modified co-dependency basis would contribute to: a greater (resp, lesser) numeric value, in place of a first concrete characteristic, for the modified distributed computation; and a greater (resp, lesser) numeric value, in place of the second concrete characteristic, for the modified distributed computation. Observe that it is possible for a pair of concrete characteristics of a distributed computation to both correlate positively and correlate negatively in a distributed computation; one way this can occur is that a distributed computation can have resulted in a maximal value for a second concrete characteristic such that any change to a correlation basis shared by the two concrete characteristics, including a change that provides a greater value of the first concrete characteristic and another that provides lesser value, result in a lesser value for the second concrete characteristic.

Correlate negatively: the statement that a first concrete characteristic and a second concrete characteristic of a distributed computation correlate positively; or equivalently that the first concrete characteristic correlates positively with the second concrete characteristic of the distributed computation, means that both the first and the second concrete characteristics have numeric values and the first and the second concrete characteristics share a co-dependency basis, which is a datum or set of data such that by changing the normal execution of the distributed procedure in the distributed computation only by replacing the value or values of the co-dependency basis in the distributed computation with the value or values of the modified co-dependency basis, would result in a modified distributed computation of the distributed procedure in which actions taken by computer executable instructions on the value or values of the modified co-dependency basis would contribute to: a greater (resp, lesser) numeric value, in place of a first concrete characteristic, for the modified distributed computation; and a lesser (resp, greater) numeric value, in place of the second concrete characteristic, for the modified distributed computation. Observe that it is possible for a pair of concrete characteristics of a distributed computation to both correlate positively and correlate negatively in a distributed computation; one way this can occur is that a distributed computation can have resulted in a maximal value for a second concrete characteristic such that any change to a correlation basis shared by the two concrete characteristics, including a change that provides a greater value of the first concrete characteristic and another that provides lesser value, result in a lesser value for the second concrete characteristic.

Positioning information: information of past, present, or future planned physical movement, physical location, or both for an asset is positioning information of and for that asset. An asset can obtain positioning information from a comprised location sensing device, a circuit that a location sensing device is attached to, or another asset that such a device or circuit is associated with or attached to. An asset can be observed externally and positioning information created entirely away from the asset. Positioning information can be relative to positioning information of another asset, both of which could be moving relative to a frame of reference. For example, a compass heading from a second asset that is approximately in the direction of a first asset, that is used to collocate the second asset toward the first asset, is positioning information of the first asset. Any information that is derived from positioning information of a second asset, and that can be used or is used to collocate a first asset toward the second asset, is or comprises positioning information of the second asset. Positioning information is in general relative to another asset or a frame of reference. Positioning information may have lesser or greater precision, in that it may comprise location information that is accurate e.g. to within 50 feet horizontally and only 100 feet vertically (e.g. relative to the sea-level earthsphere). Positioning information may comprise only horizontal location information and no information about vertical position or movement. Positioning information may be relative to a prior position of the same asset, as might be obtainable from an accelerometer. Positioning information may consist of only a single location or a single constraint on location. For example, a single value for latitude for an asset, without any altitude or longitude information is positioning information for the asset. Speed and direction of movement for an asset, without any location information, is also positioning information for that asset. Positioning information may be derived from other information; for example, if a location sensing device is used to obtain different locations at the beginning and end of a time interval, then movement of the object can be inferred during that time interval; in this way movement information is inferred and perhaps derived or computed from location information. Inference can be made in the opposite direction, positioning information can be taken from an accelerometer that can measure certain outside forces acting on an object, and that positioning information can be used to infer or compute acceleration, movement, and location relative to previous locations—and the previous locations may also be unknown so that the derived positioning information is relative to an unknown prior position. Positioning information may consist entirely of a plan for future movement and location, and such a plan may be derived from past positioning information; such a derivation may use knowledge of roads and topology where the movement and locations are planned; it may also use knowledge of movement capabilities of an asset. Positioning information in this and other ways may be derived from other positioning information. Positioning information may be derived, without changing it in any way, from itself as well as from other different positioning information. If a datum comprises positioning information for an asset, then that datum is said to be a representation of positioning information for that asset. Writing that positioning information of an asset is transmitted, stored, or computed means that data that comprises a representation of positioning information for that asset is transmitted, stored, or computed. Positioning data for an asset is data that comprises positioning information for the asset.

Positioning sensing device: a positioning sensing device is a device that can be used to obtain positioning information for itself (as an asset), for assets that it may be associated with physically, or for assets that it may observe. Without limitation such devices include, as examples, GPS (Global Positioning System) user equipment devices, other NSS (Navigation Satellite System) user equipment devices, accelerometers, gyroscopes, magnetometers, altimeters, depth gauges, compasses, radars, sonic location sensors, laser range finders, binocular range finders, radio direction-finding and triangulation devices, conventional radar, phased-array radios and radar, radios as proximity sensors, other proximity sensing devices, depth sounding devices, and sonar devices.

Track: a first asset tracks a second asset by generating or receiving positioning information of the second asset and using that information for a purpose dependent on the positioning information of the second asset. For example, storing positioning information of a second asset and using or transmitting it later specifically for position dependent purposes, as would be done e.g. by a tracking service, is a form of tracking the second asset. Using such information in a guidance system to collocate toward a second asset is a form of tracking the second asset. Displaying such information on a screen for a human to perceive positioning information of the second asset is a form of tracking the second asset. In contrast, transmitting a packet by a network communication node, such as a network router, that contains positioning information of the second asset but which, to the router, is just another opaque packet to be stored and forwarded to its destination, is not an example of tracking the second asset; again note that the eventual receipt of such a packet and then using its contents for a position dependent purpose is a form of tracking the second asset.

As described above, the present disclosure has been described in association with various aspects thereof and it is understood that many changes and modifications to the described aspects can be carried out without departing from the scope and the spirit of the present disclosure that is intended to be limited only by the appended claims.

What is claimed:

1. A system for assets to track assets in an electronic communication network, the system comprising:
   at least one hardware-based processor and at least one hardware-based memory storing at least one sequence of computer executable instructions;
   at least one NSSUE (Navigation Satellite System User Equipment) radio, physically associated with a first asset;
   at least one positioning sensing device, physically associated with a second asset;
   a tracking distributed computation of a distributed procedure comprising the at least one sequence of computer executable instructions, further comprising:
      transmitting second asset positioning data from the second asset;
      sensing the second asset positioning data by the at least one positioning sensing devices; and
      deriving first asset positioning data from NSS (Navigation Satellite System) radio signals by use of the at least one NSSUE radios at a NSS fix time, wherein the NSS fix time consequently depends on the second asset positioning data, such that the NSS fix time is determined by a time when the second assent only transmits updated positioning data based on either straying from a predicted position or after a maximum amount of time is exceeded between positioning data transmissions, thereby saving battery life.

2. The system of claim 1, wherein during the tracking distributed computation, information transfer between devices physically associated with the first asset and devices physically associated with the second asset occurs through intermediate communication nodes in the electronic communication network that are not physically associated with either the first asset or second asset.

3. The system of claim 1, wherein the tracking distributed computation comprises:
   deriving second asset tracking data from the second asset positioning data; and
   tracking the second asset by the first asset by use of the second asset tracking data.

4. The system of claim 1, wherein the tracking distributed computation comprises:
   deriving first asset tracking data from the first asset positioning data; and
   tracking the first asset by the second asset by use of the first asset tracking data.

5. The system of claim 1, wherein the tracking distributed computation comprises:
   deriving second asset tracking data from the second asset positioning data;
   tracking the second asset by the first asset by use of the second asset tracking data;
   deriving first asset tracking data from the first asset positioning data; and
   tracking the first asset by the second asset by use of the first asset tracking data.

6. The system of claim 1, wherein the first NSS fix time is the first time which is during the tracking distributed computation, at which positioning information of the first asset is derived from NSS radio signals using the at least one NSSUE radio and then used to derive positioning information of the first asset that is then used to track the first asset by the second asset.

7. The system of claim 1, wherein the second asset is a person, and the at least one positioning sensing device comprises a smart phone.

8. The system of claim 1, further comprising a tracking service comprising:
   at least one tracking service electronic communication node of the electronic communication network; and
   at least one tracking service memory which stores computer executable instruction sequences of the tracking distributed procedure, wherein the NSS fix time consequently depends on at least one second asset positioning representation stored in the at least one tracking service memory.

9. A method for assets to track assets in an electronic communication network, the method comprising:
   executing a tracking distributed computation of a tracking distributed procedure comprising:
      transmitting second asset positioning data from the second asset;
      sensing second asset positioning data by at least one positioning sensing devices that are physically associated with a second asset; and
      at a NSS (Navigation Satellite System) fix time, deriving first asset positioning data from NSS radio signals by use of at least one NSSUE (Navigation Satellite System User Equipment) radios physically associated with a first asset, wherein the NSS fix time consequently depends on the second asset positioning data, such that the NSS fix time is determined by a time when the second assent transmits updated positioning data based on either straying from a predicted position or after a maximum amount of time is exceeded between positioning data transmissions, thereby saving battery life.

10. The method of claim 9, wherein during the executing of the tracking distributed computation, information transfer between devices physically associated with the first asset and devices physically associated with the second asset occurs through intermediate communication nodes in the electronic communication network that are physically associated with neither the first asset nor the second asset.

11. The method of claim 9, wherein the executing of the tracking distributed computation further comprises:
    deriving second asset tracking data from the second asset positioning data; and
    tracking the second asset by the first asset by use of the second asset tracking data.

12. The method of claim 9, wherein the executing of the tracking distributed computation comprises:
    deriving first asset tracking data from the first asset positioning data; and
    tracking the first asset by the second asset by use of the first asset tracking data.

13. The method of claim 9, wherein the executing of the tracking distributed computation comprises:
    deriving second asset tracking data from the second asset positioning data;
    tracking the second asset by the first asset by use of the second asset tracking data;
    deriving first asset tracking data from the first asset positioning data; and
    tracking the first asset by the second asset by use of the first asset tracking data.

14. The method of claim 9, wherein the NSS fix time is the first time which is during the executing of the tracking distributed computation, at which positioning information of the first asset is derived from NSS radio signals using the at least one NSSUE radio and then used to derive positioning information of the first asset that is then used to track the first asset by the second asset.

\* \* \* \* \*